United States Patent [19]

Campbell et al.

[11] Patent Number: 6,012,055
[45] Date of Patent: Jan. 4, 2000

[54] MECHANISM FOR INTEGRATED INFORMATION SEARCH AND RETRIEVAL FROM DIVERSE SOURCES USING MULTIPLE NAVIGATION METHODS

[75] Inventors: Ellen C. Campbell, Menlo Park; Narciso B. Jaramillo, Redwood City; Sharon L. Hoyt, Saratoga; Kate E. Weber, San Jose; Dana L. Boudreau, Palo Alto; Michael L. Shields, Union City, all of Calif.

[73] Assignee: Silicon Graphics, Inc., Mountain View, Calif.

[21] Appl. No.: 08/629,997

[22] Filed: Apr. 9, 1996

[51] Int. Cl.[7] .................................................. G06F 17/30
[52] U.S. Cl. ................................ 707/5; 707/10; 707/3
[58] Field of Search ................................ 395/603, 610; 345/338; 707/5, 10, 3

[56] References Cited

U.S. PATENT DOCUMENTS

| | | | |
|---|---|---|---|
| 4,805,134 | 2/1989 | Calo et al. | 707/10 |
| 4,992,972 | 2/1991 | Brooks et al. | 345/338 |
| 5,123,088 | 6/1992 | Kasahara et al. | 395/357 |
| 5,228,116 | 7/1993 | Harris et al. | 395/54 |
| 5,355,472 | 10/1994 | Lewis | 707/101 |
| 5,436,637 | 7/1995 | Bayroud et al. | 345/116 |
| 5,544,354 | 8/1996 | May et al. | 707/4 |
| 5,572,643 | 11/1996 | Judson | 395/200.48 |

(List continued on next page.)

OTHER PUBLICATIONS

J. Nielson, "Multimedia and Hypertext: the Internet and Beyond," Academic Press, 1995, pp. 256, 257, entire book submitted.

Web Page, "Silicon Surf," URL=http://www.sgi.com, 1 page, copyright 1998.

Web Page, "New Silicon Surf Brings Silicon Graphics data onto Information Superhighway," URL=http://www.sgi.com/Headlines/1994/Apr/apr_02.html, 2 pages, copyright 1994, 1995.

Web Page, "Anchor Desk," URL=http://www3.zdnet.com/anchordesk/company/company_2660.html, 1 page, copyright 1997, 1998.

Web Page, "Electronic Book Technologies, Inc.," URL=http://sgi.com/Products/appsdirectory.dir/DeveloperXElectronic_Book_]12/23/97 2 pages, copyright 1995, last update Dec. 17, 1997.

Web Page, "Applications and Solutions Directory, DynaText," URL=http://sgi.com/Productsf/appsdirectory.dir/Applications/Interactive_Author . . . , 2 pages, copyright 1995, 1996,last update Dec. 17, 1997.

Web Page, "Applications and Solutions Directory, DynaWeb," URL=http://sgi.com/Products/appsdirectory.dir/Applications/Interactive_Author . . . , 2 pages, copyright 1995, 1996,last update Dec. 17, 1997.

Andy Rathbone, "Windows® 95 for Dummies®," IDG, (1995) pp. 142–144 and pp. 315–323.

*Primary Examiner*—Wayne Amsbury
*Attorney, Agent, or Firm*—Graham & James LLP

[57] ABSTRACT

A software tool providing a single access mechanism for diverse and varied information spaces. The invention incorporates a plurality of navigator interfaces, including: a "How do I?" navigator, an Index navigator, a Tree navigator, and a Search Term navigator. Each navigator operates across the entire information space, allowing the user to find information in any available online source. The user can switch between the various navigators at will. The present invention presents search results to the user in a uniform manner through iconographic and textual descriptions of the information at the other end of the link. The user then selects the information to view. After the user has performed a search of the information space and viewed the description of the search results, the invention also allows the user to perform a "cross reference" operation, the results of which can be viewed using the same or different navigator. Certain embodiments echo the search results from a particular navigator in minimized display areas corresponding to the other navigators.

23 Claims, 24 Drawing Sheets

U.S. PATENT DOCUMENTS

| | | | |
|---|---|---|---|
| 5,584,024 | 12/1996 | Shwartz | 707/4 |
| 5,623,652 | 4/1997 | Vora et al. | 707/10 |
| 5,630,125 | 5/1997 | Zellweger | 707/103 |
| 5,632,022 | 5/1997 | Warren et al. | 342/389 |
| 5,634,051 | 5/1997 | Thomson | 707/5 |
| 5,644,686 | 7/1997 | Hekmatpour | 395/50 |
| 5,644,776 | 7/1997 | DeRose et al. | 395/761 |
| 5,649,186 | 7/1997 | Ferguson | 707/10 |
| 5,659,729 | 8/1997 | Nielsen | 707/3 |
| 5,659,742 | 8/1997 | Beattie et al. | 707/104 |
| 5,671,279 | 9/1997 | Elgamal | 380/23 |
| 5,673,322 | 9/1997 | Pepe et al. | 380/49 |
| 5,742,762 | 4/1998 | Scholl et al. | 709/200 |
| 5,809,248 | 9/1998 | Vidovic | 709/219 |
| 5,835,092 | 11/1998 | Boudreau et al. | 345/347 |

Info Linking Class Library

Info Linking Class Library

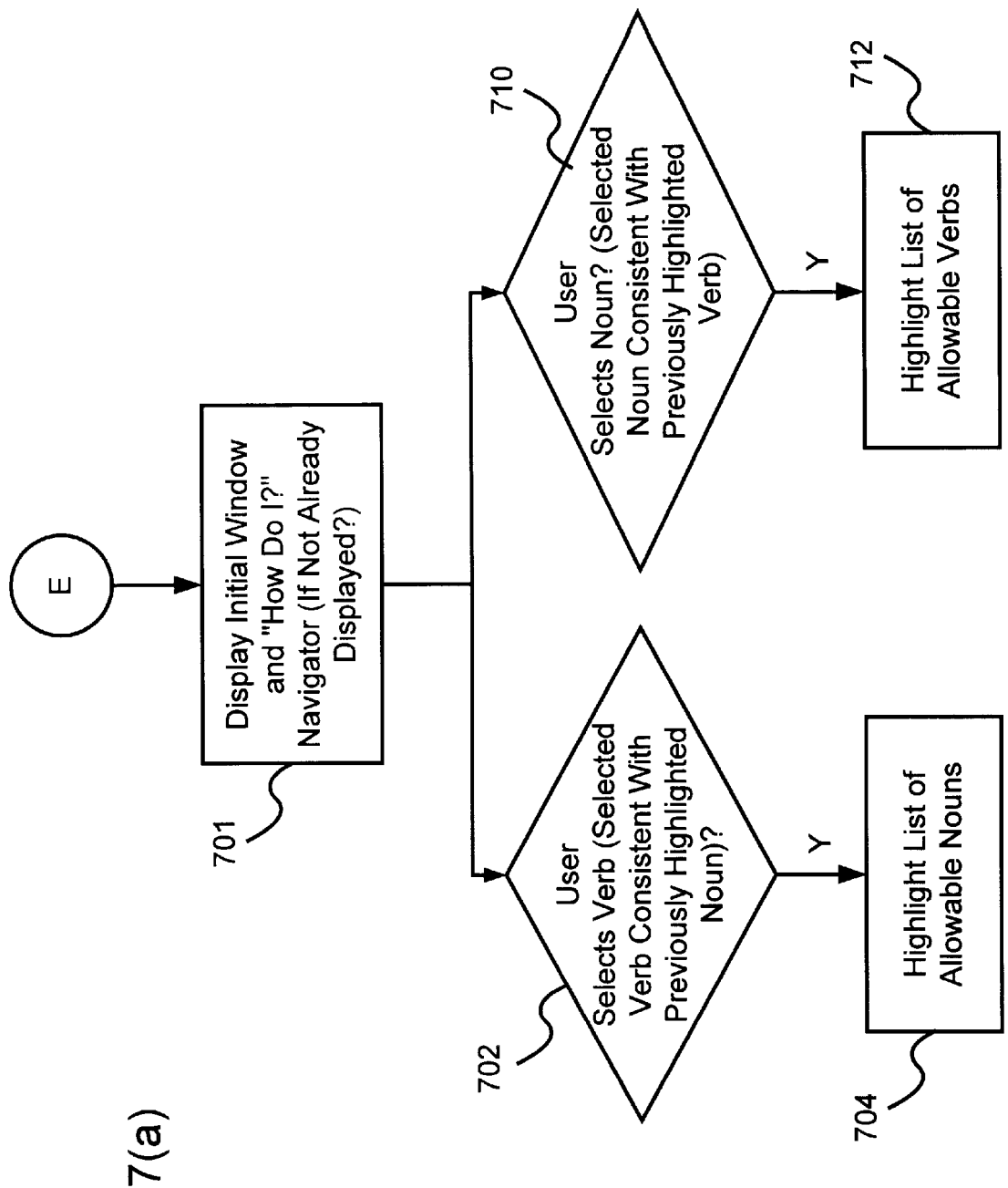

"How Do I" navigator

Index Navigator

Tree Navigator

Search Term Navigator

MECHANISM FOR INTEGRATED INFORMATION SEARCH AND RETRIEVAL FROM DIVERSE SOURCES USING MULTIPLE NAVIGATION METHODS

FIELD OF THE INVENTION

This application relates to desktop software tools and particularly to a software tool that allows a user to navigate through information from a variety of sources using a variety of navigational methods.

BACKGROUND OF THE INVENTION

People who use computer systems and networks often need to look up information about the system they are using. Traditionally, information was stored in books and manuals, which were often kept physically near to the computer. If a user needed to look up information, he turned to a single source—the paper manuals stored conveniently nearby.

Currently, however, the amount of technical information available about a given computer system can be very large and can be stored at a wide variety of sources. Information is often provided to customers in "online" form, dispensing entirely with paper copies. This online information includes online databases, CD ROM databases, proprietary help systems, and online manuals. Large amounts of technical information are also available from third party online sources and from sources such as the World Wide Web.

Amid an apparent wealth of online information, people still have problems finding the information they need. Online information retrieval may have problems including those related to inappropriate user interface designs and to poor or inappropriate organization and structure of the information. Storage of information online in a variety of forms leads to certain information retrieval problems, several of which are described below.

The existence of a variety of information sources leads to the lack of a unified information space. An "information space" is the set of all sources of information that is available to a user at a given time or setting. When information is stored in many formats and at many sources, a user is forced to spend too much "overhead" on discovering and remembering where different information is located (e.g., online technical books, manual pages ("manpages"), release notes, help information, etc.). The user also spends a large amount of time remembering how to find information in each delivery mechanism. Thus, it is difficult for the user to remember where potentially relevant information might be, and the user is forced to jump between multiple different online tools to find it.

The existence of a variety of information sources leads to information strategies that lack cohesion. Users currently must learn to use and remember a variety of metaphors, user interfaces, and searching techniques for each delivery mechanism and class of information. No one type of interface suits all users. Furthermore, a user may need different types of searching techniques and interfaces, depending on the circumstances and the nature of the specific information needed.

The existence of a variety of information sources leads to lack of links between sources of information. Conventional delivery mechanisms often support only loosely structured navigation, such as keyword search or hyperlinks. Such mechanisms provide the user with only a local organization of information instead of providing a global picture of the information space.

The existence of a variety of information sources leads to frustration if the information uses a wide variety of terms or uses terms not familiar to the user. In addition, users employ concepts and terms differently than technical writers and authors. Conventional delivery mechanisms often rely on a keyword search as a primary means of finding information. If the user's vocabulary does not sufficiently overlap with indices employed by a delivery mechanism, a keyword search will result in a high percentage of disappointing and frustrating "term misses." The only recovery method for a failed keyword search is simply to guess at better query.

The existence of a variety of information sources leads to titles and descriptions of the information that are not intuitive to a user. Users often conceptually group and describe problems differently than do information organizers and writers. If, for example, a user does not know the title of a book or the name of a database, he may not be able to find the information stored therein.

As computer systems become more complex and as sources of online information proliferate, it becomes more and more difficult for users to locate the information they need. Even worse, users may not always be aware of all the existing sources of information. Moreover, certain users may not use certain sources of information, even though they are aware of them, if they are not familiar with the interface or find it too difficult to use.

SUMMARY OF THE INVENTION

The present invention provides a single access point for a diverse and varied information space. The invention allows a user to navigate through all available sources of information and to choose which of a plurality of interfaces the user wishes to use when accessing the information. The invention incorporates a plurality of navigator interfaces, including: a "How Do I?" navigator, an Index navigator, a Tree navigator, and a Search Term navigator. The Index, Tree, and Search navigators operate across a broad information space, allowing the user to find information in any available online source, while the "How Do I?" navigator offers only task oriented information targeted at novice users. The user can select whichever navigator he feels will provide an appropriate search strategy and technique for locating and accessing the information described by the user. The user can switch between the various navigators at will.

The current advantage of having multiple navigators is to support different ways of finding terms and topics, depending on how specifically the user knows his needs and how much extraneous information he is willing to sift through. For example, the "How Do I?" Navigator presents a highly restricted set of query terms linked only to simplified task-oriented information selected for each term combination by human link authors. This provides simple interface for information about common tasks, and is likely to find highly relevant information because of the handcrafting of the links, but is limited in the scope of information it can access. On the other end of the spectrum the keyword search now allows the user to enter any query terms desired, and searches automatically in many different kinds of information, with no human-handcrafted links involved. This allows the user to reach the entire information space, but runs the risk of returning many potentially irrelevant results, and conversely, may miss many relevant pieces of information that do not happen to contain the term(s) the user provided. In between are the index and tree navigators, which provide more complete coverage of the information and space than the "How Do I"? navigators, but which provide handcrafted result lists, avoiding some of the problems of the Search Navigator. The present invention additionally allows the user to perform powerful searches by combining navigators.

The present invention presents search results to the user in a uniform manner through iconographic and textual descriptions. This consistent presentation gives the user a sense of an information type and the information found during a search, and allows the invention to represent various attributes of that information to users before they actually retrieve it.

The navigators interact by "echoing" cross-referenced search results between the navigators. Cross-referencing/echoing is performed after the user has performed a search of the information space. Cross-referenced information is information relevant to the search performed. The present invention can incorporate automatic echoing, user-initiated cross-referencing, or cross-referencing using a cross-reference window. After a cross-reference operation has been performed, the user can chose to view the navigators having cross-referenced terms. Some navigators may access information differently than do other navigators, and different navigators organize the information space differently. The cross-reference feature allows the user to switch navigation strategies while keeping the same topical subtext.

In accordance with the purpose of the invention, as embodied and broadly described herein, the invention is a method of searching an information space, comprising the steps, performed by a data processing system, of: displaying an initial window, wherein one navigator of a plurality of navigators, designated as a first current navigator, is displayed in a current navigator area; displaying, in the initial window, respective navigator areas representing others of the plurality of navigators; inputting an indication that the user wishes to use a particular one of the other navigators as a new current navigator; and displaying, in the current navigator area of the initial window, the particular navigator indicated by the user in the current navigator window, in place of the current navigator.

In further accordance with the purpose of this invention, as embodied and broadly described herein, the invention is a method of searching an information space including a plurality of types of information, comprising the steps, performed by a data processing system, of: displaying an initial window, wherein one navigator of a plurality of navigators, designated as a current navigator, is displayed in a current navigator window; inputting a search term via the current navigator; and performing a search of at least two types of information in the information space in accordance with the search parameter, wherein a respective search engine is used to search each respective information type.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIGS. 7(a) and 7(b) are flow charts showing steps performed during operation of the "How Do I?" navigator.

DETAILED DESCRIPTION OF THE PREFERRED EMBODIMENTS

Reference will now be made in detail to preferred embodiments of the invention, examples of which are illustrated in the accompanying drawings. Wherever possible, the same reference numbers will be used throughout the drawings to refer to the same or like parts.

I. Overview of the Present Invention

Figure 1:
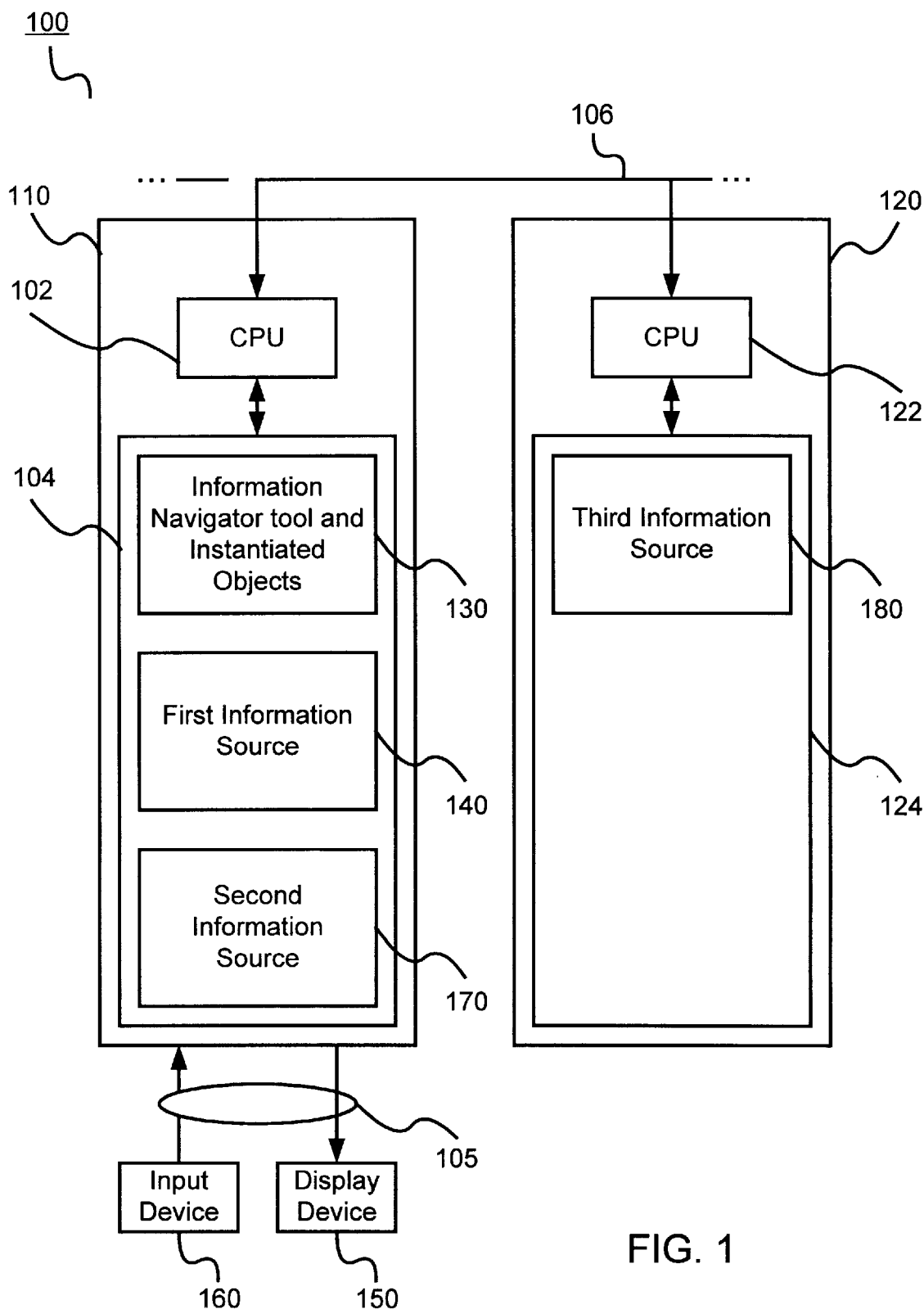
FIG. 1 is a block diagram of a computer system in accordance with a preferred embodiment of the present invention.

FIG. 1 is a block diagram of a computer system 100 in accordance with a preferred embodiment of the present invention. Computer system 100 includes a first computer 110. Computer 110 includes a CPU 102, a memory 104, input/output lines 105, a display device 150 (e.g., a display terminal) and an input device 160 (e.g., a mouse). Computer system 100 can also include a second computer 120 connected to first computer 110 by way of a LAN, WAN, internet connection, etc. Second computer 120 includes a CPU 122 and a memory 124. It will be understood by persons of ordinary skill in the art that computer system 100 can also include numerous elements not shown in the Figure for the sake of clarity, such as disk drives, keyboards, display devices, network connections, additional memory, additional I/O elements, additional CPUs, LANs, etc.

Memory 104 includes information navigator tool software 130 and a plurality of information sources, including a first information source 140 and, a second information source 170. Memory 124 includes a third information source 180. The operation of information navigator toolkit 130 is discussed in detail below. First, second and third, information sources 140, 170, and 180 can be of the same information type or different information types, as discussed in more detail below. Information source 180 may be, for example, a WebPage on the World Wide Web or an online database of "help information."

Computer system 110 also includes an operating system (not shown), such as the Silicon Graphics' IRIX operating system, which is a version of the Unix operating system. "IRIX" is a registered trademark of Silicon Graphics, Inc. Computer system 100 also includes ViewKit, a C++ library that adds convenient interfaces and functionality to the OSF/Motif X Toolkit, which is also a part of computer system 100. It will be understood that the present invention is not limited to any particular hardware, operating system, or type of computer system. The present invention, although implemented in an object-oriented methodology, is not limited to an object-oriented implementation.

II. Automatic and User-Initiated Echoing

Figure 2:
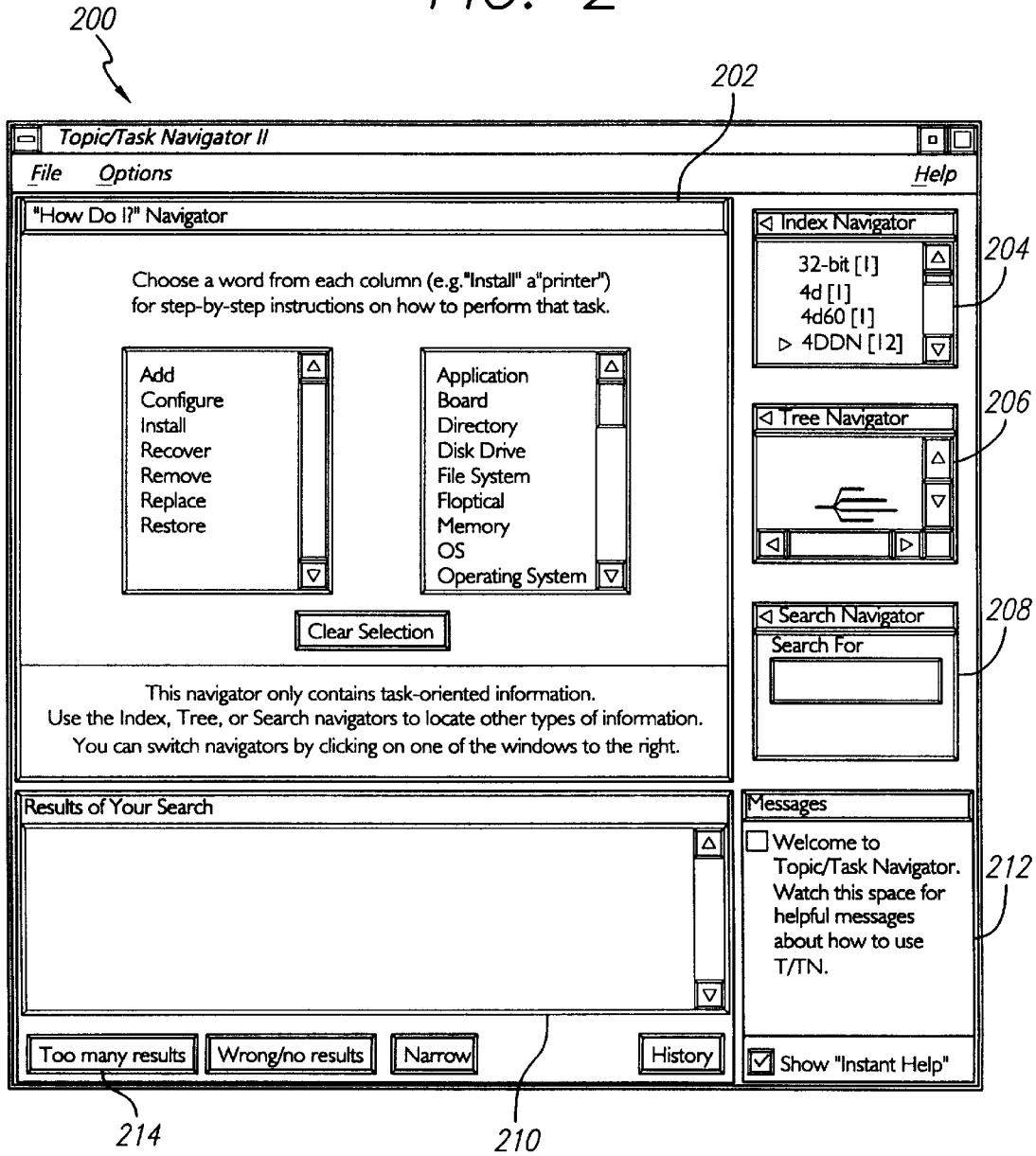
FIG. 2 shows an initial screen display of the embodiment of FIG. 1, where the "How Do I?" Navigator is the selected navigator.

FIG. 2 shows an initial screen display 200 of the embodiment of FIG. 1. The screen display of FIG. 2 is the initial screen display shown when the navigator tool software of the described embodiment is first executed. Screen display 200 includes a selected navigator area 202; three minimized navigator areas 204, 206, and 208; a search results area 210; a help message area 212; and buttons 214. As discussed above, the present invention allows the user to chose between a plurality of navigators. Note that buttons 214 are "greyed out" until after a search is performed. After a search, the user can click on any of buttons 214.

The described embodiment includes four navigators: a "How Do I" navigator (shown in selected navigator area 202), an Index navigator (shown in minimized form in minimized navigator area 204), a Tree navigator (shown in minimized form in minimized navigator area 206), and a Search Term navigator (shown in minimized form in minimized navigator area 208). Operation of each of these navigators is described below in turn.

In the described embodiment, the "How Do I?" navigator is the default navigator that is displayed in selected navigator area 202 when the software of the present invention is first executed. The user can, however, chose to use a different navigator by selecting one of the navigators displayed in one of minimized areas 204, 206, or 208. Such a selection is made by indicating one of the minimized areas with input device 160. When a navigator is selected by the user, that navigator is displayed in selected area 202 and the previously selected navigator is displayed in one of the minimized areas 202, 204, or 206.

Figure 3:
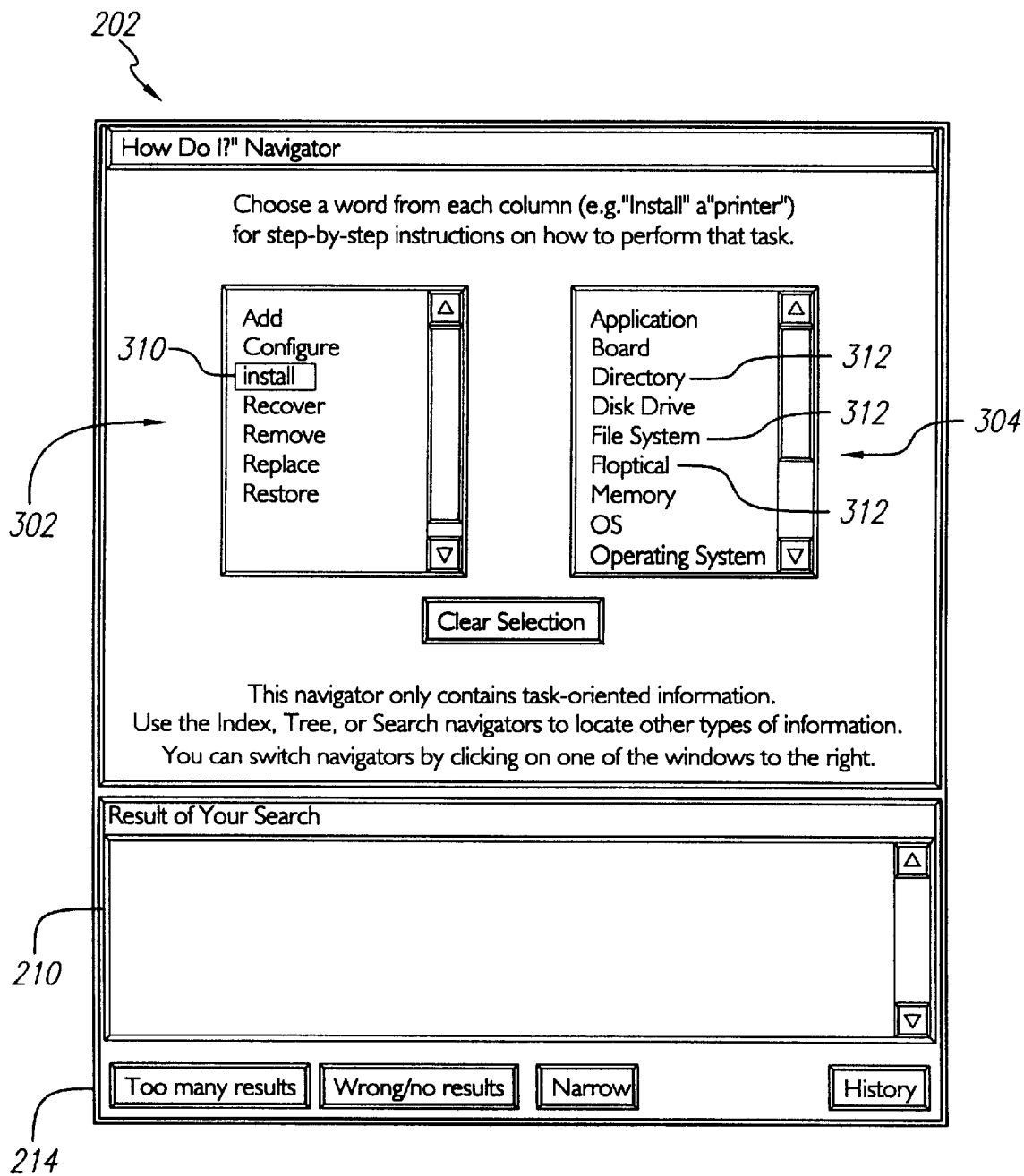
FIG. 3 shows the selected navigator area of FIG. 2, where the "How Do I?" navigator is the selected navigator and the user has selected a first search term.

FIG. 3 shows the selected navigator area 202 of FIG. 2, where the "How Do I?" navigator is the selected navigator. The "How Do I?" navigator provides a "task oriented" approach to an information search by providing the user with a list of verbs 302 and a list of nouns 304. The navigator provides an obvious entry point for task information by limiting the user to the listed verbs and nouns. It allows the user to ask questions in the form "How do I <verb> a <noun>?" In the described embodiment, these verb-noun pairs refer to step-by-step multimedia and task oriented information, such as Task Pros presentations, TaskCards, Desktop Guides and portions of online manuals.

To specify a search, the "How Do I?" navigator allows the user to select from either list 302 or list 304 using input device 160 (e.g., a mouse). Both lists 302 and 304 are scrollable, as is known in the art. In FIG. 3, the user has selected the verb "Install" 310. As soon as the user makes his selection, the "How Do I?" navigator highlights the selected verb in list 302 and also grays out all but a selected subset 312 of noun list 304 that corresponds to the selected verb. After a verb has been selected, only nouns in subset 312 can be chosen by the user. This helps the user select verb-noun pairings that correspond to existing information sources. The user is not allowed to chose verb-noun pairings that do not correspond to existing information. Thus, only verb-noun pairings that have corresponding database keys in "How Do I?" model 552 can be chosen.

Figure 4:
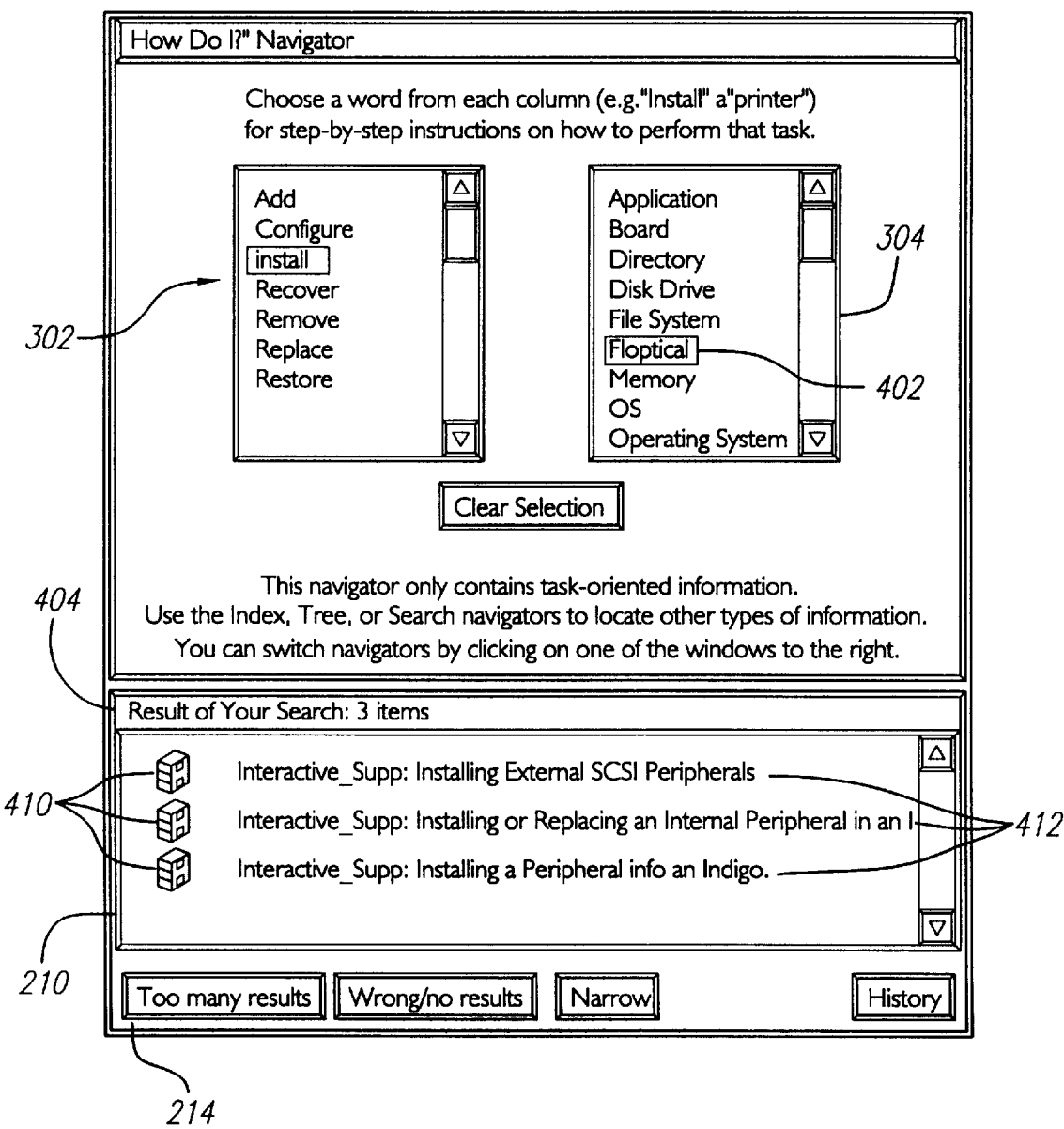
FIG. 4 shows the "How Do I?" navigator area of FIG. 3, after a search has been performed.

FIG. 4 shows the selected navigator area of FIG. 3 after a search has been performed. In FIG. 4, the user has selected one of the highlighted nouns ("Floptical") 402. In the described embodiment, once the user selects both a verb and a noun, a search is performed, as described below. The number of pieces of information found is displayed in area 404. Descriptions of the search results (i.e., the pieces of information found) are displayed in search results area 210.

The described embodiment includes an automatic echoing feature. Search terms in other navigators that point the same search results that were just retrieved are also highlighted in the minimized navigator areas 204, 206, and 208 (unless the minimized navigator area is for the search Term navigator). This highlighting of corresponding terms in the minimized navigator areas is called "echoing." In search result area 210, each piece of information found during the search preferably is represented by an icon 410, indicating a type of information, and a text description 412.

In the described embodiment, the information space includes, but is not limited to, the following types of information sources:

1) IRIS InSight Books, including glossary terms, which are online manuals available from Silicon Graphics, Inc.; "IRIS InSight" is a trademark of Silicon Graphics, Inc.

2) Online unix manuals (also called "manpages");

3) World Wide Web documents (Silicon Graphics internal web pages are called "Silicon Surf," which is a trademark of Silicon Graphics, Inc.);

4) TaskCards, described in co-pending application of Boudreau et al., entitled *A Mechanism for Non-Linear Browsing of Diverse Information Sources*" Ser. No. 08/629, 967, now U.S. Pat. No. 5,835,092 which is herein incorporated by references;

5) Task Pros;

6) Online Release Notes; and

7) Software applications that can be launched from search results area 210.

IRIS InSight books are described, for example, in "IRIS InSight Professional Publisher Templates" and "IRIS InSight Professional Publishers Users Guide." Manpages are described, for example, in "Building Manual Pages and Release Notes." Information on manpages can also be obtained from any Unix system by typing "man man" (i.e., by looking at the online information about manpages. Silicon Surf is described, for example, in "http://www.sgi.com" and at "New Silicon Surf Brings Silicon Graphics Data into Information Superhighway" at "http://www.sgi.com/headlines/1994/Apr/apr_02.html." Each of the above-described Web Pages and Manuals is herein incorporated by reference.

FIG. 4 shows part of scrolled search results area 210 containing icons for three pieces of information having an information type of IRIS InSight books. As discussed below in connection with FIG. 8, each type of information has its own viewer and may be read in its native format.

If a piece of information is not available, it will be displayed in search results area 210 in gray. This may occur, for example, if the network is down and the user can't access the web, if the viewer is not available, or if the relevant information is not installed.

The described embodiment is implemented using an object-oriented methodology. Navigator Tool 130 includes a re-usable extensible C++ class library that provides a common interface to multiple information types. Navigator Tool 130 uses this library to access a database of links and communicate with search engines for each particular information type.

Figure 5A:
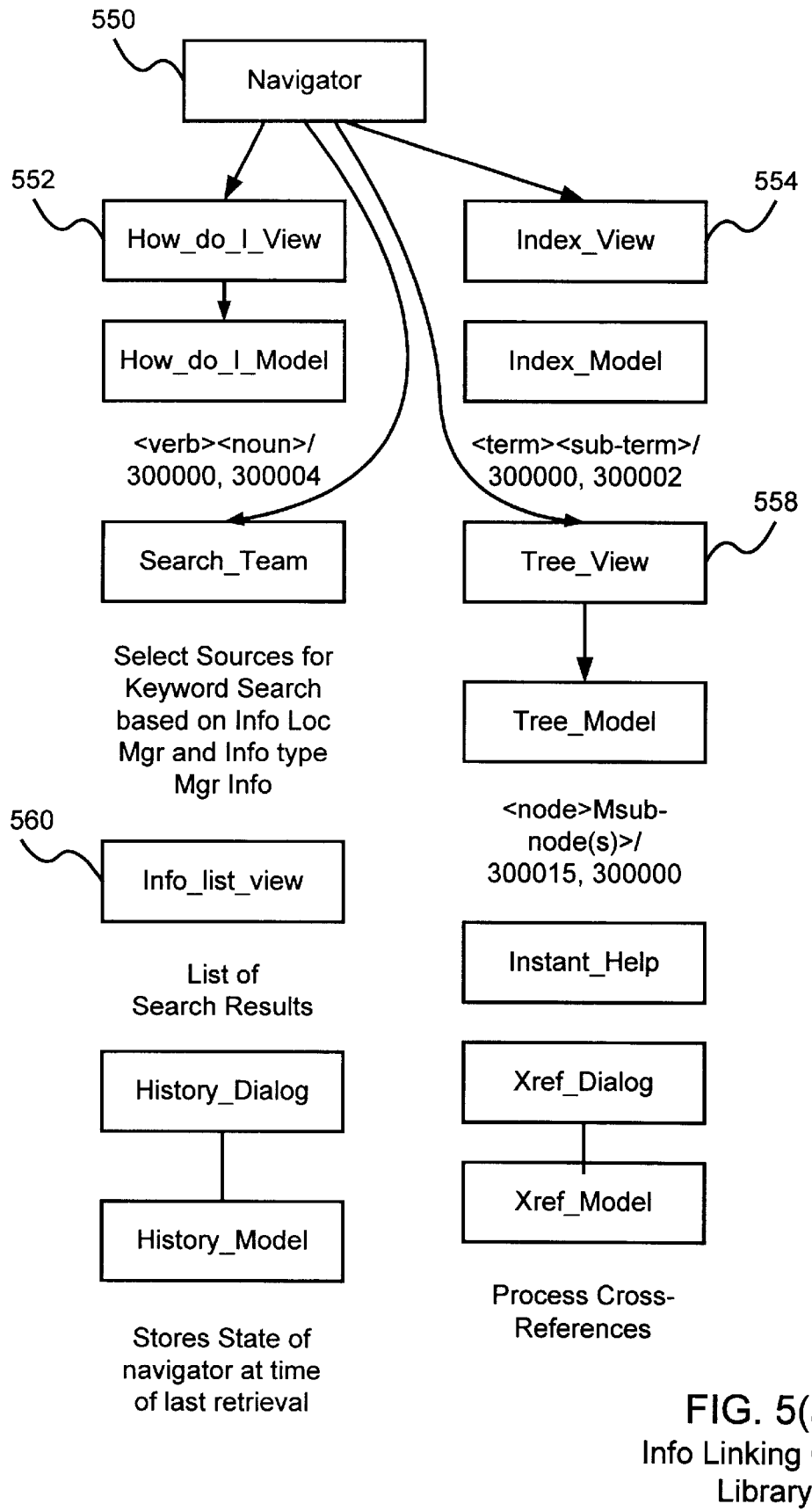
FIG. 5 is a block diagram representing classes and data structures used in a preferred embodiment of the present invention.
Figure 5B:
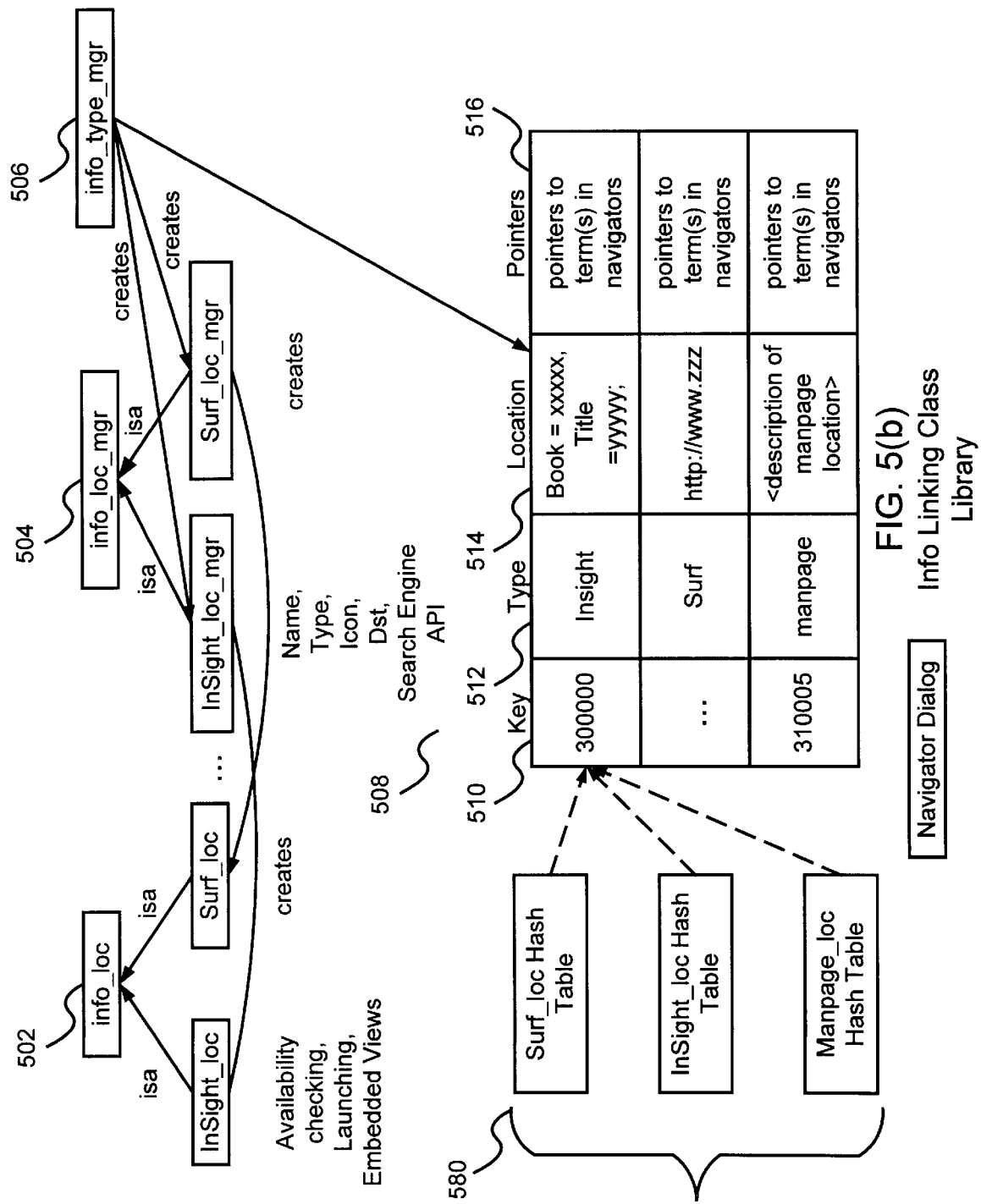

FIG. 5 is a block diagram representing classes used in a preferred embodiment of the present invention. The class info_loc 502 has sub-classes for each type of information source (InSight_loc, manpages_loc, surf_loc (for the World Wide Web), etc.). Each sub-class encapsulates routines to check whether the information source is available, and to launch an application for viewing the information source. The class info_loc_mgr 504 has sub-classes for each type of information source (InSight_loc_mgr, manages_loc_mgr, surf_loc_mgr, etc.). Each sub-class encapsulates routines to create info_locs of the information type. Each subclass also identifies the name, type and icon of its information type. The class info_type_mgr 506 creates one instance of each info_loc_mgr and passes them any predetermined default parameters and accesses a database 508, described below.

Database 508 preferably has a format as shown in FIG. 5, although other similar formats may be used. Each entry corresponds to a piece of information in the current information space. Each database entry includes a key 510, which is a unique identifier for the piece of information. Each database entry also includes a type field 512, which identifies the type of the information. For example, the location information for ISIS InSight book looks like: 128 | InSight | Shelf=SGI_EndUser | Book=PerSysAdmin | TitlePath= Changing File Permissions | StartEid=30526 | Pointers= HChange/Permissions IPermissions Here, 128 is the database key, most of the fields are taken directly from the original link spec, and StartEid is a pointer to an exact location in the InSight book. "Pointers" is the list of navigator elements that point to this link (for use in echoing/cross-referencing); for example, here it specifies that the "How Do I" noun-verb pair "Change/Permissions" and the index term "Permissions" point to this link.

Each database entry also includes a series of fields 514 which, as a group, form a pointer to the actual location of the information. The actual format of this pointer depends on the type of the information. Field 516 contains pointers to the various terms/nodes in the models for the various navigators ("How Do I?", Tree or Index) that reference the information. These pointers are used in cross-referencing/echoing.

FIG. 5 also shows a navigator class 550, which contains and controls objects of classes representing each type of navigator in the system. For example, FIG. 5 shows four classes, one for the "How Do I?" navigator 552, the Index navigator 554, the Search Term navigator 556, and the Tree navigator 558. Each of the sub-classes encompasses a model for information displayed by that particular navigator. For example, the "How Do I?" navigator model stores a plurality of verb-noun pairs, along with one or more keys of database 508 for each verb-noun pair. The "How Do I?" navigator model also keeps track of which verb-noun has been selected.

The Index navigator model 554 stores a data structure corresponding to the complete Index navigator. Each term is associated with one or more keys of database 508 and possibly one or more subterms. The Index navigator model also stores, for each term that contains subterms, whether the term is expanded on the display and which term(s) are selected. The Tree navigator model 558 stores a data structure corresponding to the Tree navigator, with each node having one or more associated keys of database 508. The Tree navigator model also indicates whether each node is expanded and which node(s) are currently selected.

The Search Term navigator model 556 stores the names of a search engine in the corresponding info_loc_mgr subclass 504 for each searchable type of information. The Search Term navigator, thus, causes a search to be performed across the entire information space each time the user requests information. Unlike the other three navigators, the Search Term navigator does not retrieve information from the local info_loc database. Instead, it calls methods of each subclass of info_loc_mgr to determine which information types support keyword searches, and stores information about those types in its model. The Search Term navigator then calls other methods in those classes to perform keyword searches, according to settings that the user chooses in the Search Term navigator window.

FIG. 5 also includes a plurality of hash tables 580. Each hash table corresponds to an information type. Given a location of information (e.g., a WebPage address), the hash table for the corresponding type of information hashes to the entry in database 508 for that information. Once the database entry is found, it is possible to index to the navigator elements for the information via field 516. As discussed below in connection with FIG. 18, the Search Term navigator requires special handling during cross-referencing.

Figure 6:
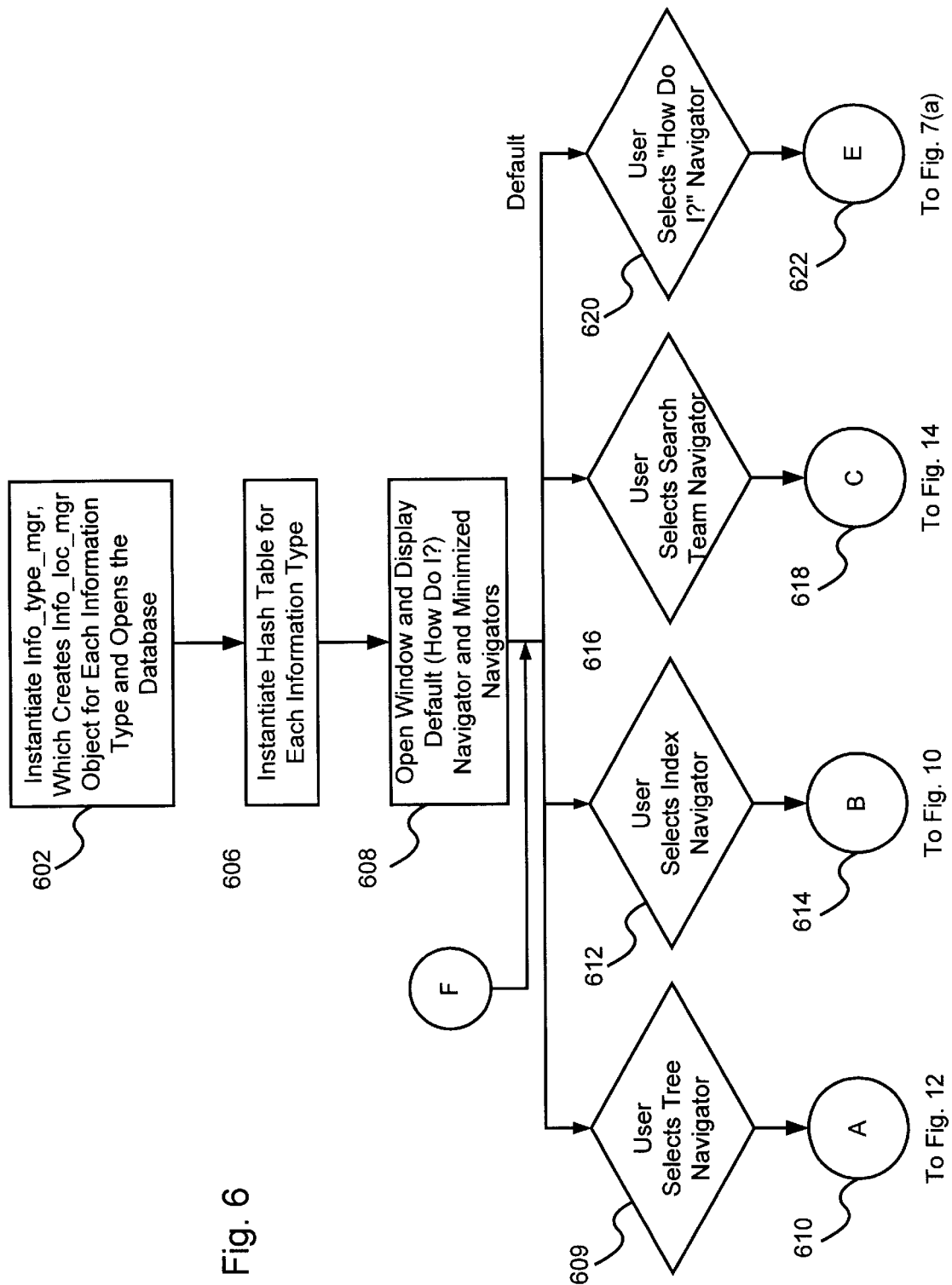
FIG. 6 is a flow chart showing steps performed during initialization of the navigator tool.

FIG. 6 is a flow chart showing steps performed during initialization of the present invention It will be understood by persons of ordinary skill in the art that the flow charts in this document generally represent steps performed by CPU 102 in accordance with instructions stored in memory 104. When the navigator toolkit in accordance with the present invention is started, it first instantiates, in step 602, an info_type_mgr object, which creates a loc_mgr object for each type of information source (e.g., IRIS InSight books, etc.) and opens the information location database 510, which is preferably stored on disk. The hash tables 580 and database 508 are created prior to the execution of the software.

In addition, when the navigator tool software is first executed, a navigator window is opened in step 606 and a subwindow is opened for the default navigator, (e.g., the "How Do I?" navigator in selected area 202). A subwindow is also opened for each minimized navigator (e.g., minimized areas 204, 260, and 208). If the user uses the default navigator, control passes to FIG. 6. Otherwise control passes as shown in steps 609–616. A pointer to the current navigator is stored in memory 104.

Figure 7B:
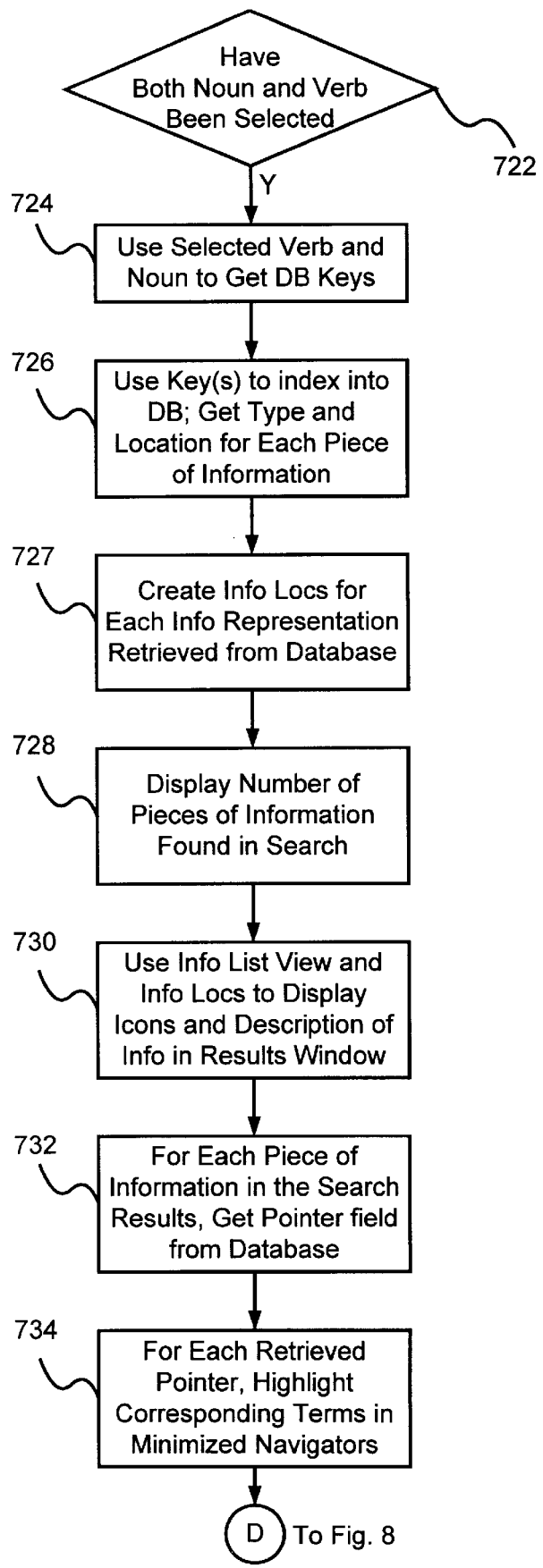

FIGS. 7(*a*) and 7(*b*) are flow charts showing steps performed during operation of the "How Do I?" navigator. When the user attempts to select a verb in step 702 (e.g., the verb "Install" 310 of FIG. 3), the software determines whether the verb is available for selection. For example, if the user has previously selected a noun from noun list 304, only certain corresponding verbs are available for selection. If no noun is currently selected, all verbs are available for selection. In step 704, if no noun is currently selected, then nouns in noun list 304 that do not correspond to the selected verb are grayed out to indicate that they are not selectable.

When the user attempts to select a noun in step 710, the software determines whether the noun is available for selection. For example, if the user has previously selected a verb from verb list 302, only certain corresponding nouns are available for selection. If no verb is currently selected, all nouns are available for selection. In step 712, if no verb is currently selected, then verbs in verb list 302 that do not correspond to the selected noun are grayed out to indicate that they are selectable.

After step 722 determines that both a noun and a verb have been selected, a search is performed and displayed in accordance with 722–730. In step 724, the selected verb and noun are used to access "How Do I?" navigator model 552, which yields one or more database keys 510. In step 726, each key is used to index into database 508 to obtain the type and location of each piece of information corresponding to the selected verb-noun pair. In step 727, an info__loc is created for each piece of information in the search results.

As shown in FIG. 5, "How Do I?" model object 552 stores all terms and sub-terms for the "How Do I?" navigator. For each valid verb-noun combination, "How Do I?" model object 552 stores one or more keys of database 508. In step 728, a message stating the number of pieces of information (i.e., the number of keys) found is displayed in area 404. In step 730, descriptions of the search results (i.e., the pieces of information corresponding to the keys) and icons representing the information type(s) of the information are displayed in search results area 210 in accordance with the info__list__view object 560. In search result area 210, each piece of information found during the search preferably is represented by an icon 410, indicating a type of information source, and a text description 412.

Before each piece of information is displayed, its info__loc is queried to determine if the piece of information represented by that info__loc is actually available on the user's system. If not, the description is still displayed, but is grayed out. In the described embodiment, this availability check does not occur for Web access, since that would involve a great deal of overhead to check for such links.

Database 508 keeps track of which information is referenced by which navigator. Thus, in step 734, for each pointer 516 retrieved in step 732, a corresponding term/node/word pair is highlighted in the minimized navigator area in step 734. The terms in models 552–558 are marked to indicate cross-referenced terms. The process is called "automatic echoing."

Figure 8:
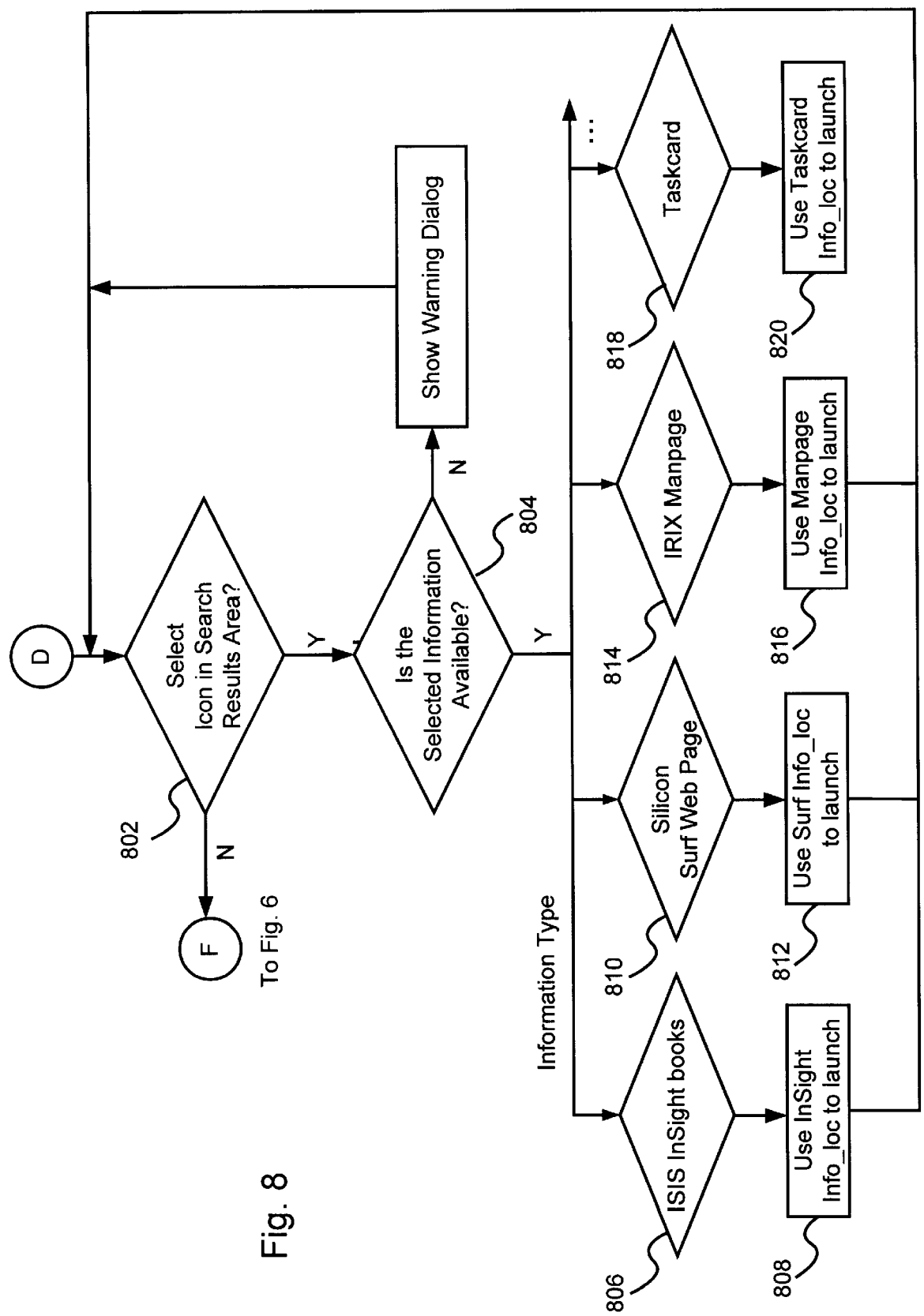
FIG. 8 is a flow chart showing steps performed to view a piece of information discovered during a search.

FIG. 8 is a flow chart showing steps performed to allow a user to view a piece of information discovered during a search. In the described embodiment, this information is the information described in search results area 210 and in object 560. The steps of FIG. 8 preferably are performed without regard for which navigator was used to specify the search parameters.

In the described embodiment, each piece of information is represented uniformly to the user through iconographic and textual descriptions in area 210. The search results give the user a sense of where they'll be going if they select a link, and allows the navigator tool to represent various attributes of that information to the user before the user actually retrieves it. When the user selects one of the search result icons in area 210 (step 802), the navigator tool first determines in step 804 (via the corresponding info__loc object) if the information is available. If so, the navigator tool launches an appropriate viewer and goes to the actual information via the viewer as shown in steps 806–820. If not, a warning dialog is displayed in step 805. In some cases, the description in search results area 210 represents an executable program, and selection of that information by the user results in the launch of an application via the appropriate info__loc object 502.

Figure 9:
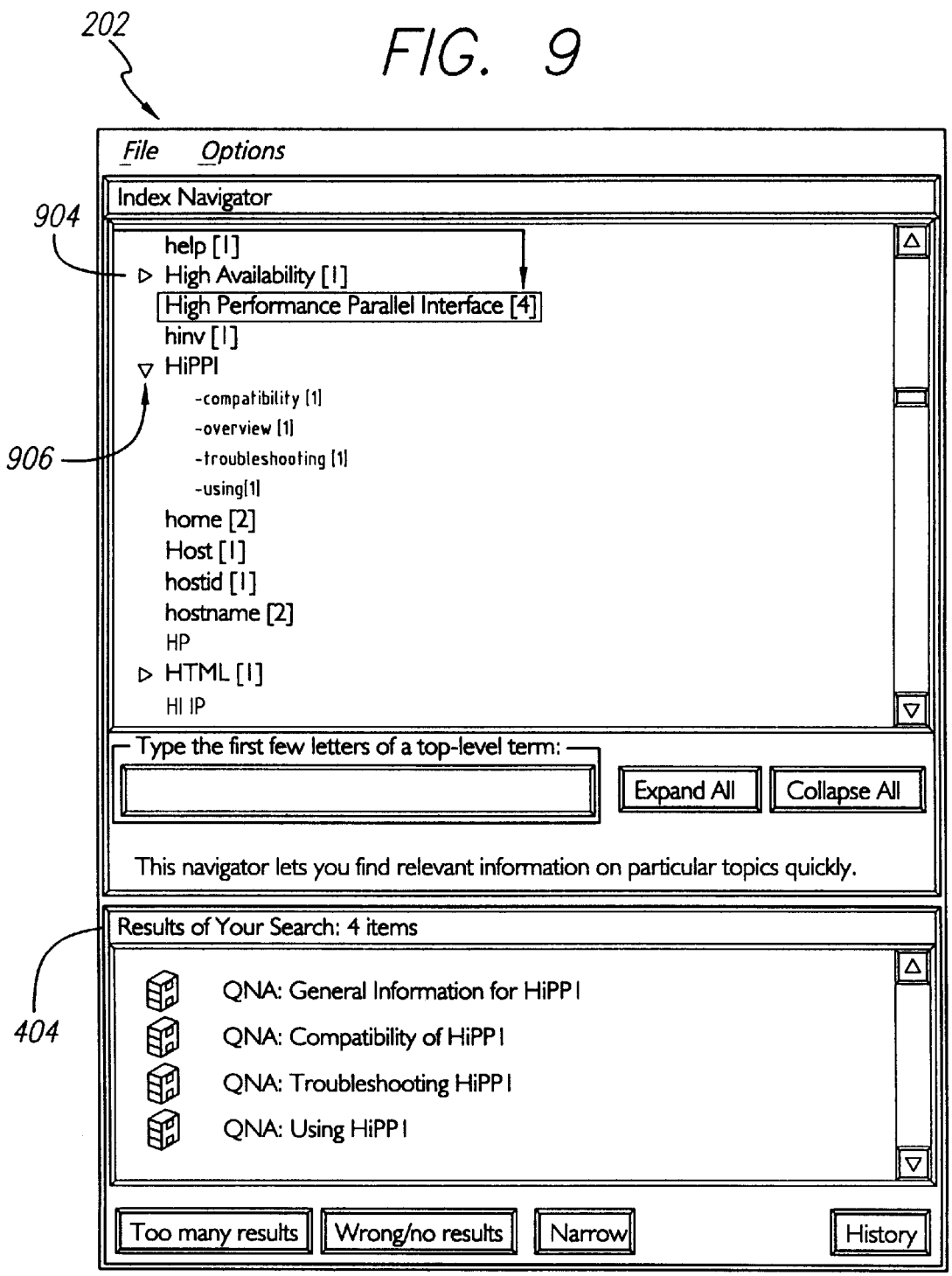
FIG. 9 shows the selected navigator area of FIG. 2, where the Index navigator is the selected navigator.

FIG. 9 shows the selected navigator area 202 of FIG. 2, where the Index navigator is the selected navigator. The user has previously selected the Index navigator by clicking on the minimized Index navigator area. The Index navigator provides the functionality of a topical index, similar to the index of a book. The index navigator preferably has two levels of terms, and uses a collapsible outline interface, so that users need not be presented with all subterms at once.

Terms having sideways pointing arrows 904 are "collapsed," which means that they have associated non-displayed sub-terms. Terms that do not have arrows have only one level of data. When the user selects a collapsed term, that term is expanded to show its sub-terms. Expanded terms, such as term 906 ("HPPI") are displayed with downwards pointing arrows. Clicking on an arrow next to an expanded term collapses it. Clicking on an arrow next to an unexpanded term expands it. Clicking on an expanded term retrieves the information directly attached to that top-level term (not to its subterms). Clicking on an unexpanded term retrieved the information of both it and its subterms. Clicking on a subterm (or a term with no subterms) retrieves information from that subterm.

Users can scroll around in the Index navigator using the scroll bar. However, since the index is large, users may also take advantage of the "term finder box." As the user types characters into this box, the index automatically scrolls to the first top-level index term starting with those characters and continues to match terms as the user types.

As shown in FIG. 5, Index model object 554 stores all terms and sub-terms for the Index navigator. For each term and sub-term, Index model object 554 stores one or more keys of database 508. The number next to each index term and sub-term on the display shows how many pieces of information are attached to it in Index model object 554. For example, term 904 ("High Performance Parallel Interface") has four pieces of information attached to it.

Figure 10:
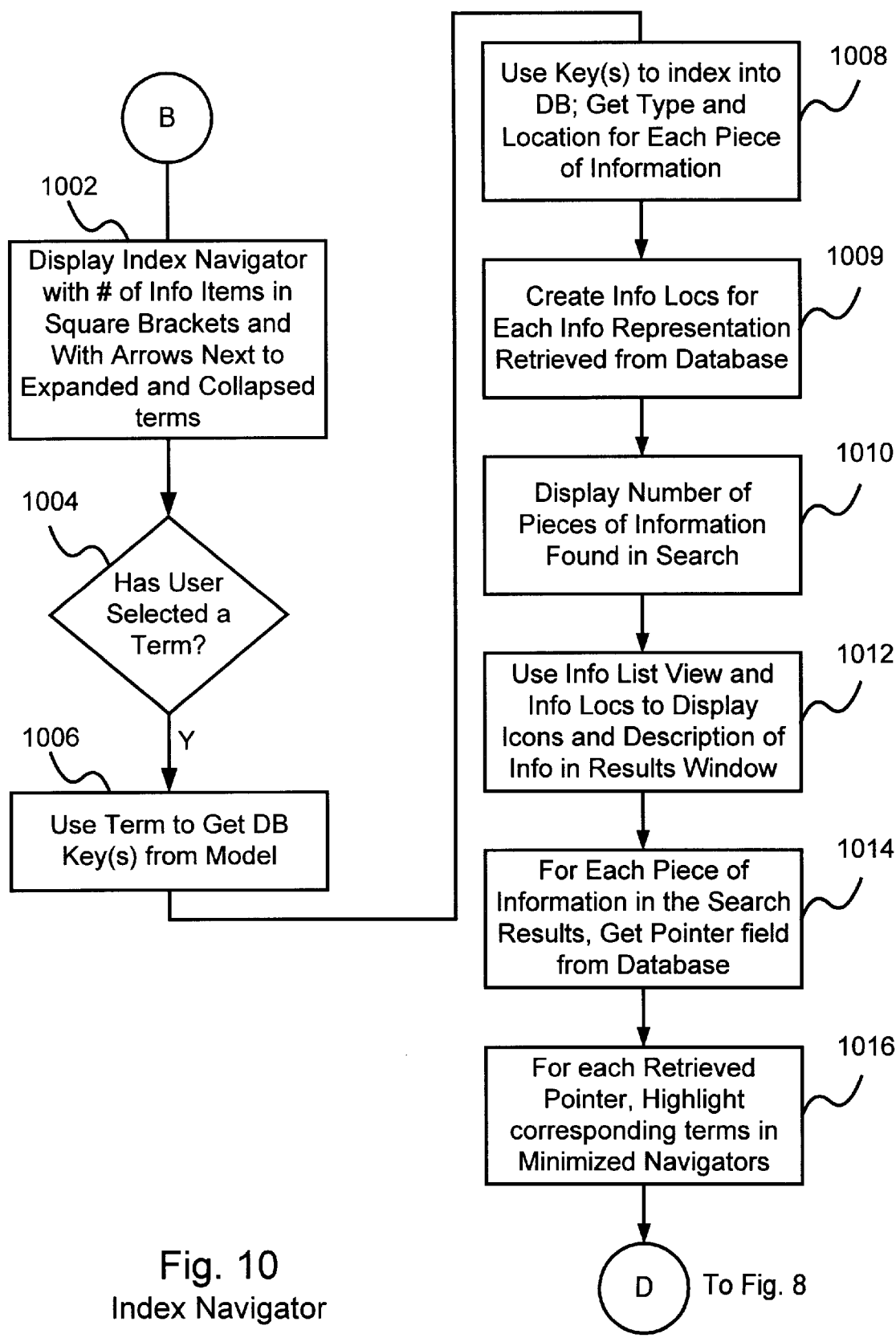
FIG. 10 is a flow chart showing steps performed during operation of the Index navigator.

FIG. 10 is a flow chart showing steps performed during operation of the Index navigator. No flow charts are provided for the collapse/expand or scrolling functions, as these functions are known to persons of ordinary skill in the art. Initially, in step 1002, the Index terms are displayed in collapsed fashion, with expandable terms indicated by sideways facing arrows. FIG. 9 shows term 906 after it has been expanded by the user. When the user selects a term or sub-term in step 1004 (eg., the term "High Performance Parallel Interface" 902 of FIG. 9), the software highlights that term, performs a search and displays the search results in steps 1006–1016. In step 1006, the selected term is used to access Index navigator model 554, which yields one or more database keys for the requested information. In step 1008, each key is used to index into the database 508 to obtain the type and description of information corresponding to the selected term(s).

As shown in FIG. 5, the results of each search (pointers to the info_locs of the resulting information) are stored in an info_list_view object 560. Each info_loc includes an icon, location, and pointers to related topics (i.e., to other navigator elements that point to the same thing). In step 1009, an info_loc is created for each piece of information found. In step 1010, a message stating the number of pieces of information found is displayed in area 404. In step 1012, descriptions of the search results (i.e., the pieces of information found) are displayed in search results area 210 in accordance with the info_list_view object. In search result area 210, each piece of information found during the search preferably is represented by an icon 410, indicating a type of information source, and a text description 412.

Database 508 keeps track of which information is referenced by which navigator. Thus, in step 1014, for each pointer 516 retrieved in step 1012, a corresponding term/node/word pair is highlighted in the current and minimized navigator areas in step 1014. The terms in models 552–558 are marked to indicate cross-referenced terms. The process is called automatic "echoing." After the search results are displayed and echoed, control passes to FIG. 8.

Figure 11A:
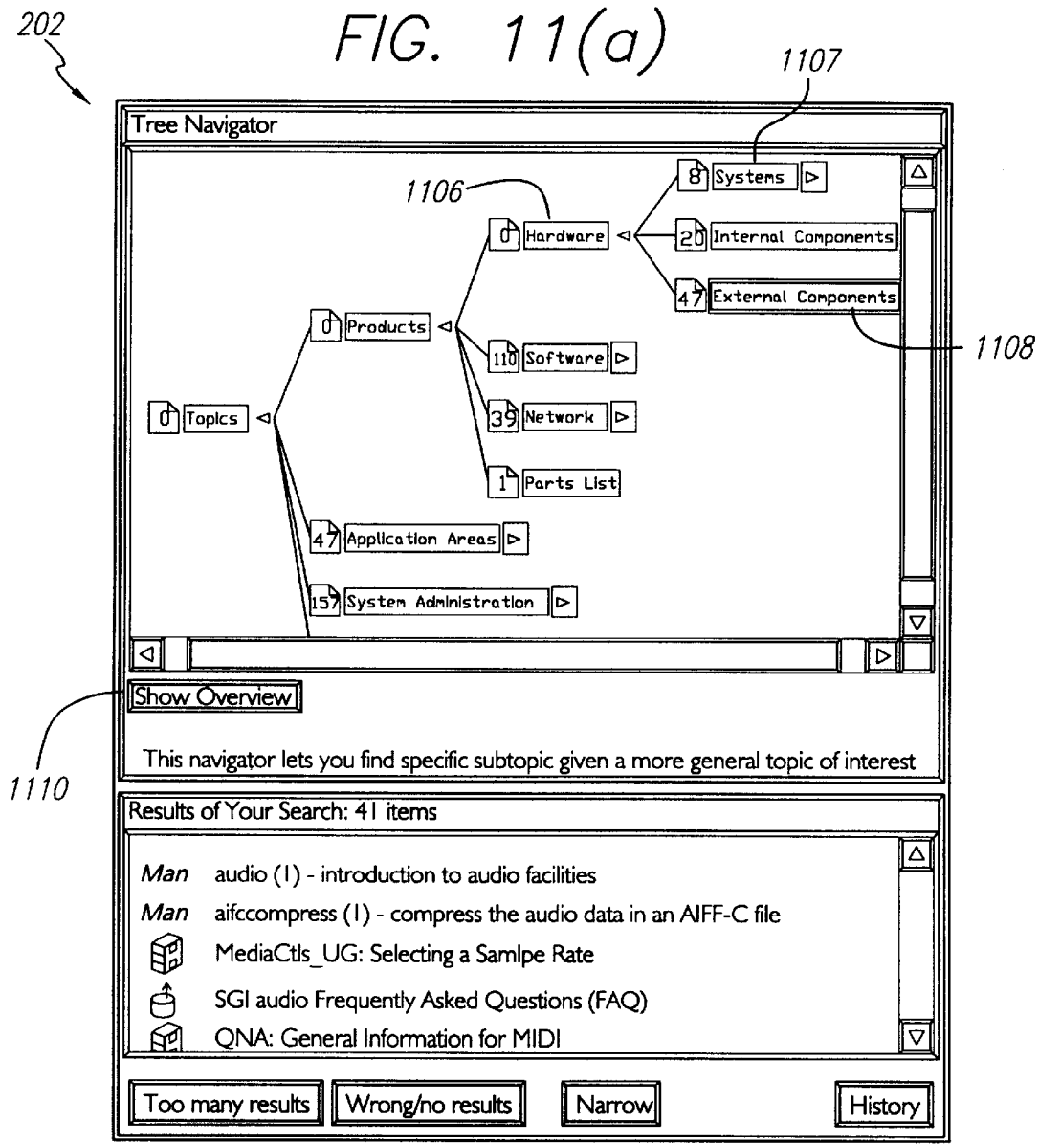
FIG. 11(a) shows the selected navigator area of FIG. 2, where the Tree navigator is the selected navigator.

FIG. 11(a) shows the selected navigator area 202 of FIG. 2, where the Tree navigator is the selected navigator. The user has previously selected the tree navigator by clicking on the minimized Tree navigator area. The Tree navigator provides a graphical depiction representing several topical hierarchies. The structure of the Tree is a conceptual map of key concepts that are covered by the information space. Two general kinds of information are supplied by conceptual maps, i.e., the actual information that is linked to the tree labels or nodes (similar to the information in the Index navigator). The organization and relationship of the branches and nodes themselves provide information about the collections of information throughout the information space. The display of the Tree navigator tells the user how information is grouped and organized without the user having to retrieve extra documents. The Tree navigator is an alternative to keyword searching and is ideal for users who know the general subject area they are interested in, but not the exact terms used by the authors of the information.

Nodes having forward pointing arrows 1104 are "collapsed" which means that they have associated non-displayed sub-branches. When the user selects a collapsed node, that node is expanded to show the sub-branches for that node. The described embodiment can have an unlimited number of tree levels. Expanded nodes, such as node 1106, preferably are displayed with backward pointing arrows. When a node is "collapsed," such as node 1107, so that none of its sub-nodes are shown, it represents all of its sub-nodes as well. The number next to it reflects all the information attached to its sub-nodes, as well as its own information. Conversely, when a node is "expanded," it only represents the information attached to it, and the number and the selection behavior reflects this. Clicking on/selecting a collapsed node expands the nodes and clicking on/selecting an expanded node collapses that node. If the user selects an interior tree node, then all the children of that node are also selected.

Figure 11B:
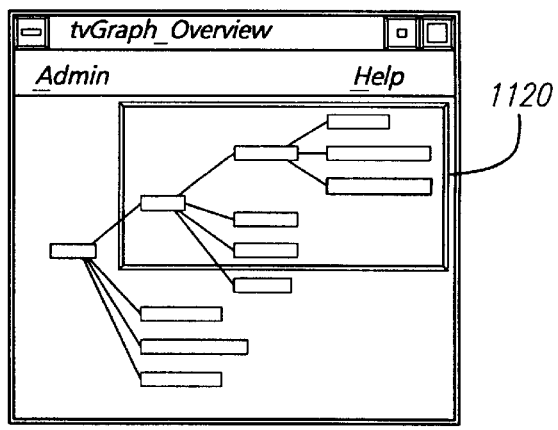
FIG. 11(b) shows a tree overview window displayed in connection with the Tree navigator of FIG. 11(b).

Users can scroll around in the Tree navigator using the scroll bar. However, since the Tree can be large, users may also take advantage of the "Show overview" 1110 button, which displays the Tree navigator overview window of FIG. 11(b). This window helps the user keep a larger context of the tree as the tree branches expand. The rectangular "viewport" 1120 indicates that part of the tree currently visible in the current tree window 202. The user can move to other areas of the tree by moving the viewport 1120.

Figure 12:
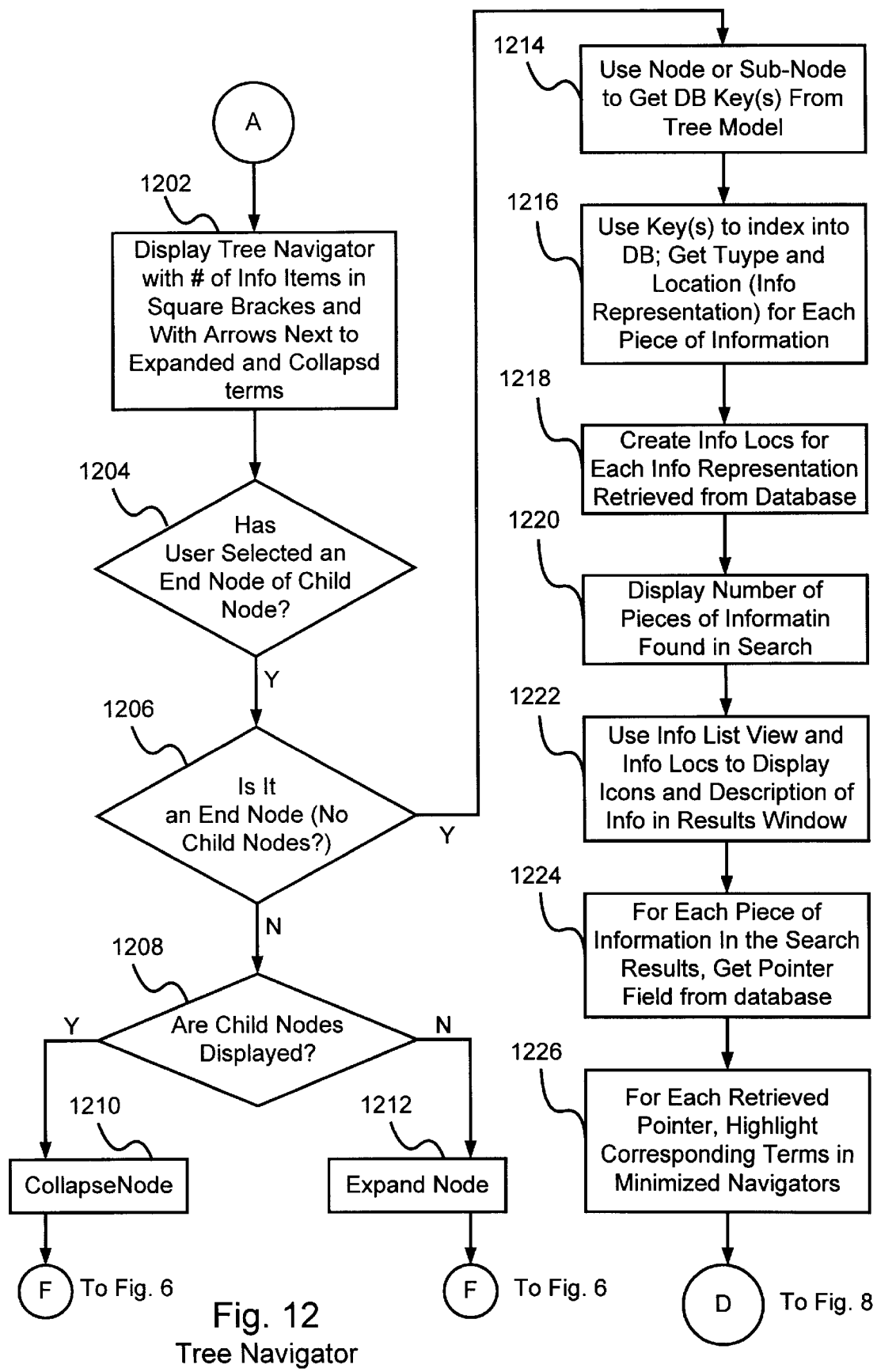
FIG. 12 is a flow chart showing steps performed during operation of the Tree navigator.

As shown in FIG. 5, Tree model object 558 stores one or more keys to database 508 for each node and sub-node. The number next to each tree node and sub-node on the display shows how many pieces of information are attached to it in Tree model object 556. For example, node 1108 has four pieces of information attached to it FIG. 12 is a flow chart showing steps performed during operation of the Tree navigator. Initially, in step 1202, the Tree nodes are displayed in collapsed fashion, with expandable nodes indicated by forward facing arrows. (For example, FIG. 11 shows node 1106 ("Hardware") after it has been expanded by the user).

When the user selects a node or sub-node in step 1204 (e.g., the node "External Components" 1108 of FIG. 11), the software performs a search and displays the search results in steps 1204–1226. Step 1204 is executed if the user has selected an end node or a child node. Step 1206 determines whether the node is an end node (i.e., a node that does not have either a collapsed or uncollapsed child node). If a child node exists, if the child node is displayed, then it is collapsed in step 1210 and control passes to FIG. 6. If the child node is displayed, then it is expanded in step 1212 and control passes to FIG. 6. Otherwise, if no child node exists, control passes to step 1214.

In step 1214, the selected node(s) are used to access Tree navigator model 558, which yields one or more database keys for the requested information. In step 1216, each key is used to index into database 508 to obtain the type and description of information corresponding to the selected node(s). In step 1218, an info_loc is created for each piece of information resulting from the search.

As shown in FIG. 5, the results of each search (pointers to the info_locs of the resulting information) are stored in an info_list_view object 560. Each info_loc includes an icon, location, and pointers to related topics (i.e., to other navigator elements that point to the same thing). In step 1220, a message stating the number of pieces of information found is displayed in area 404. In step 1222, descriptions of the search results (i.e., the pieces of information found) are displayed in search results area 210 in accordance with the info_list_view object. In search result area 210, each piece of information found during the search preferably is represented by an icon 410, indicating a type of information source, and a text description 412.

Figure 13:
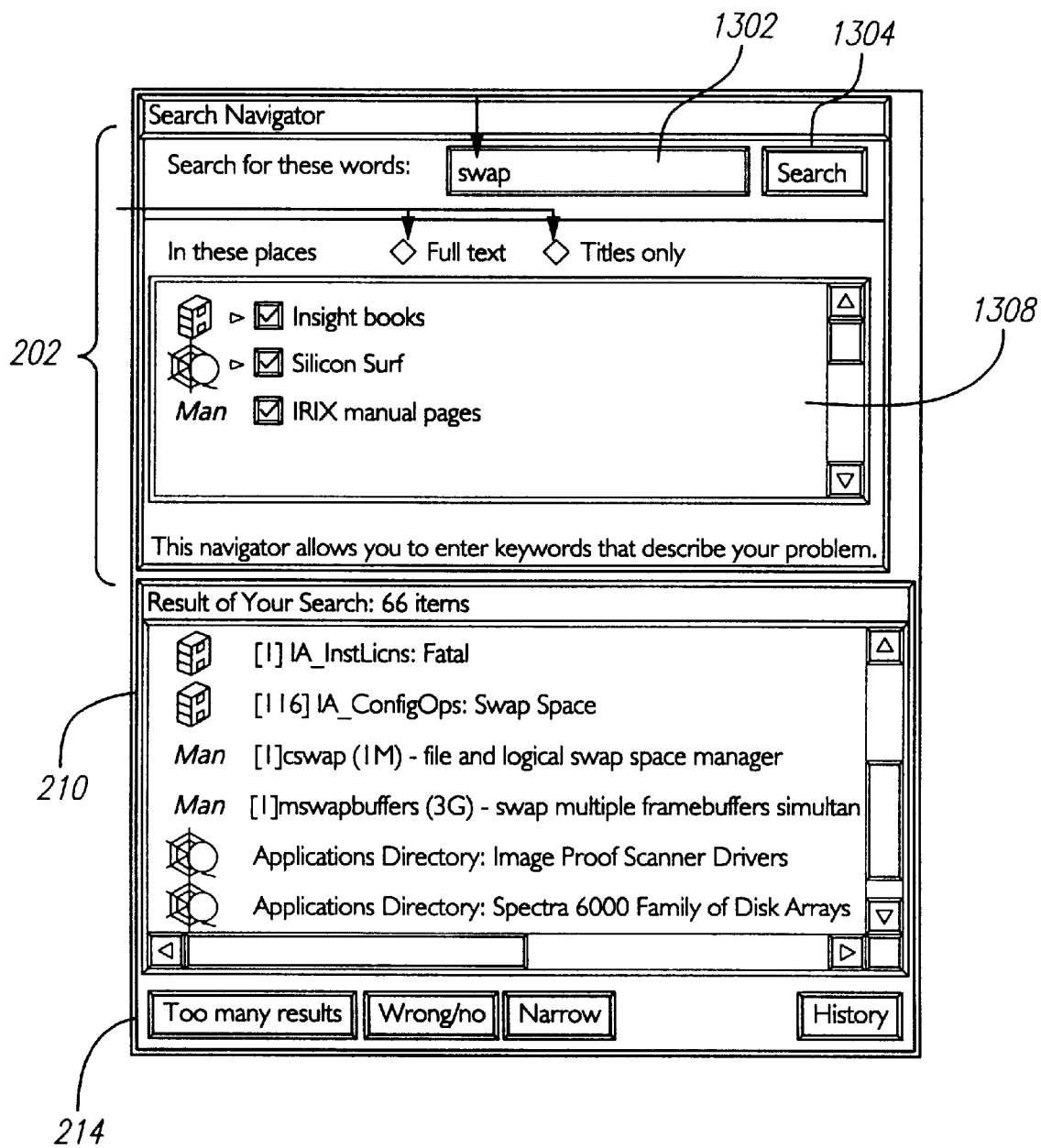
FIG. 13 shows the selected navigator area of FIG. 2, where the Search Term navigator is the selected navigator.

FIG. 13 shows the selected navigator area 202 of FIG. 2, where the Search Term navigator is the selected navigator. The user has previously selected the Search Term navigator by clicking the minimized Search Term navigator area The Search Term navigator provides keyword search functionality across the entire information space, and allows users to perform searches either in local information or over network 106 using, for example, the World Wide Web. The Search Term navigator also allows users to constrain their searches by information type, and to search on titles only or in full-text. Often, users will begin by performing a keyword search via the Search Term navigator and then refine their search by cross-referencing into one or more of the other navigational methods, instead of being forced to create more and more complicated structured keyword queries.

As shown in FIG. 13, the Search term navigator includes an area 1302 in which the user enters search terms, a "Search" button 1304, and an area 1308, in which the user can enable full-text or title searching (only one can be enabled at a time). The Search Term navigator also includes an area 1308, which allows the user to select from among all available types of information. Some information types (e.g., IRIS InSight books) have information type subsets that can be selected and deselected independently by the user. For example, if a fast search is desired, it is often helpful if the user turns off the "Silicon Surf" information type, since a search of this information type requires the search to visit a Web search engine over the net, which can slow down the search considerably. Although only three types of information are shown in area 210 of in FIG. 13, the navigator may display icons for as many types of information as are searchable on the current system. The described embodiment defaults to a full text search of all searchable information types.

As shown in FIG. 5, Search Term model object 556 references various search engines for the various information types based on information stored in respective ones of info_loc_mgr objects 504. As shown in FIG. 5, the results of each search over the specified information types (pointers to the info_locs of the resulting information) are stored in an info_list_view object 560. Each info_loc includes an icon and location of the information.

Figure 14:
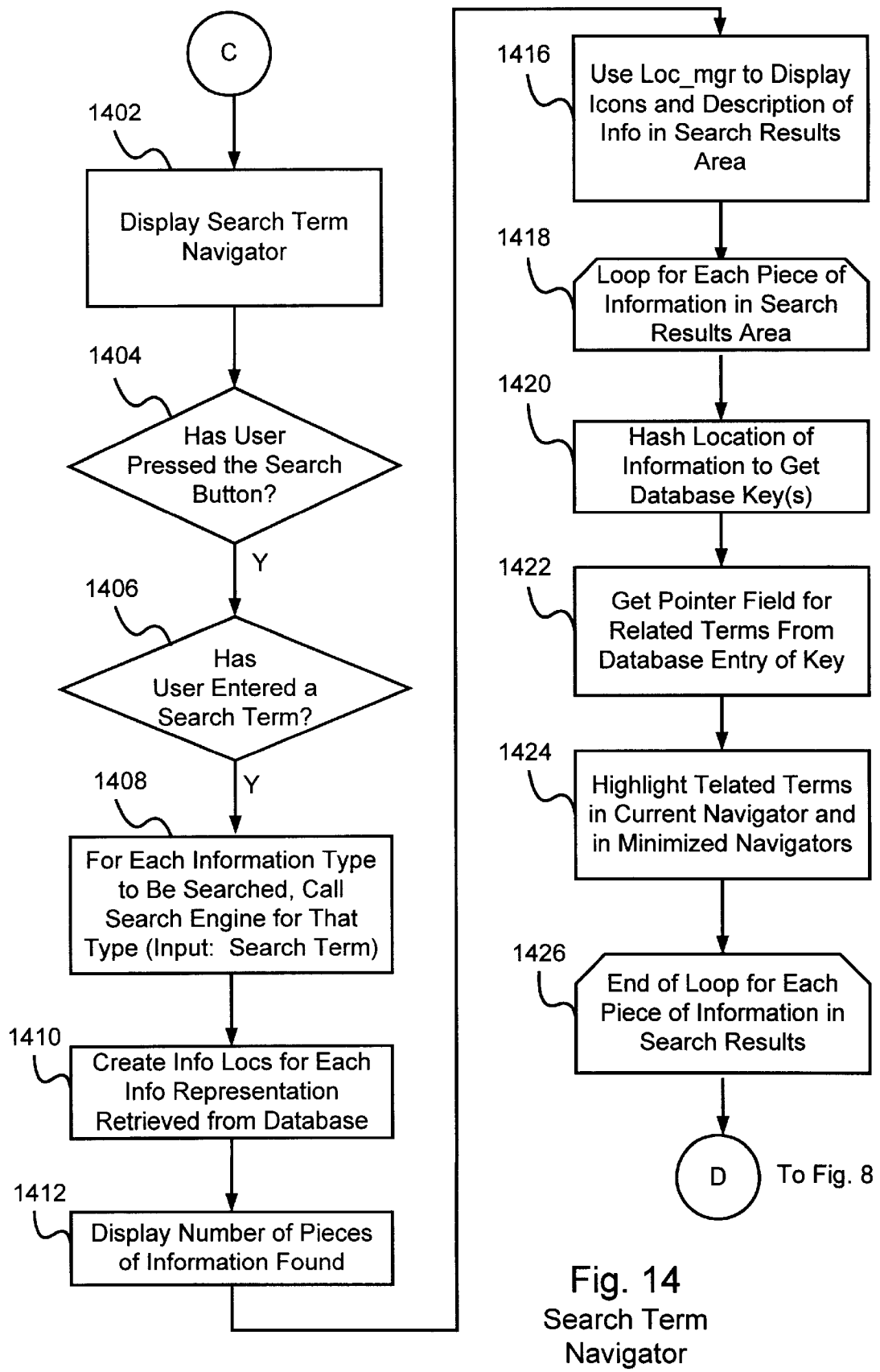
FIG. 14 is a flow chart showing steps performed during operation of the Search Term navigator.

FIG. 14 is a flow chart showing steps performed during operation of the Search Term navigator. No flow charts are provided for the functions of selecting title/full text or for selecting information types, since the implementation of these functions should be clear to persons of ordinary skill in the art from FIG. 13. Initially, in step 1402, the Search Term navigator is displayed in area 202 as shown in FIG. 13. When steps 1402 and 1406 determine that the user has clicked on "Search" button 1304 and that a search term has been entered by the user in area 1302, the software, in step 1408, initiates a search of each information type indicated by the user in area 1308. Each search engine performs a search for the search term(s) in a specific type of information. For each type of information, the search term navigator calls a search engine identified in one or more of the info_loc_mgr object for the information types. The exact steps performed by the search engines are not described herein, as these steps vary, depending on the type of information to be searched. For example, the code in an info_loc_mgr which interfaces with the search engine parses the search results from the search engine and creates info_locs in memory for each result in step 1410.

In step 1412, a message stating the number of pieces of information found is displayed in area 404. In step 1416, descriptions of the search results (i.e., the pieces of information found) are displayed in search results area 210 in accordance with the info_list_view object. In search result area 210, each piece of information found during the search preferably is represented by an icon 410, indicating a type of information source, and a text description 412.

Steps 1418–1426 perform automatic echoing for each piece of information in the search results area. In step 1420, the location of each piece of information is hashed in hash tables 580 to yield a database entry. Field 516 of that entry yields pointers to the cross-reference terms for the current navigator and the minimized navigator models (step 1422). In step 1424, for each retrieved pointer, the cross-referenced information is highlighted in the minimized and current navigators. Note that the database entry for a single piece of search results information can have many pointers 516.

Figure 15:
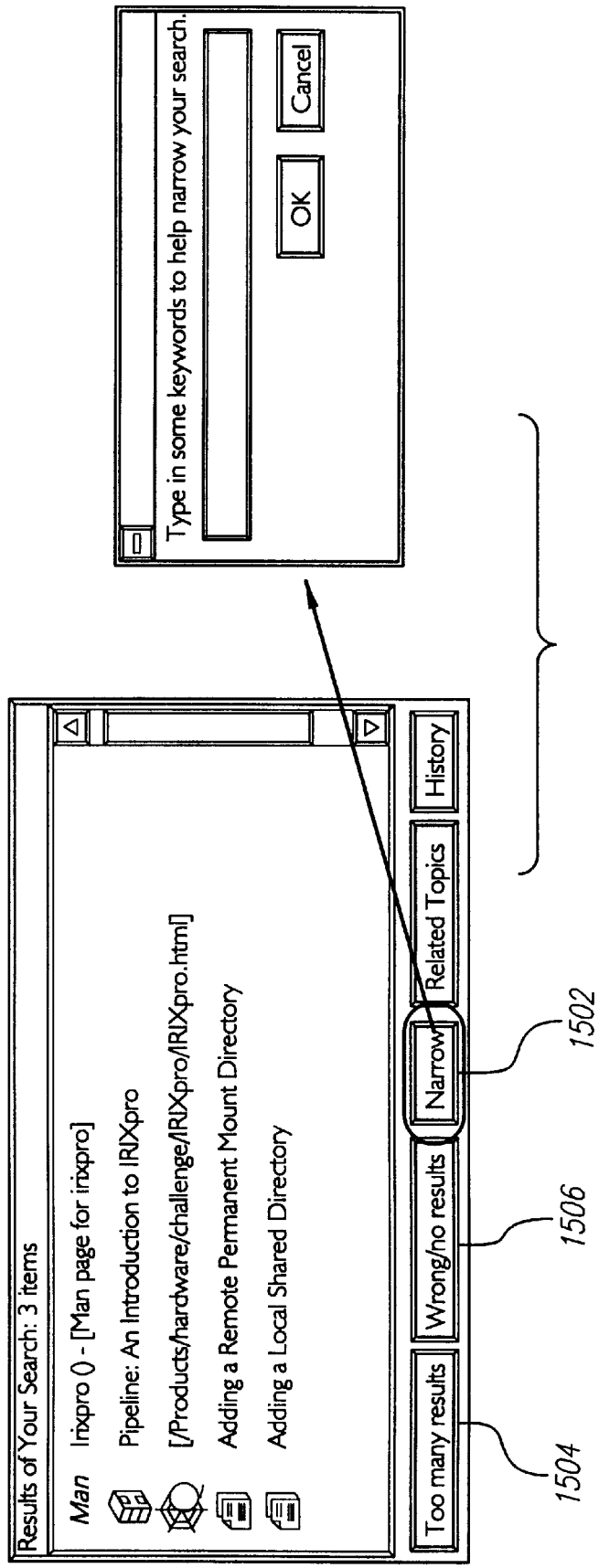
FIG. 15 shows a dialog that allows the user to narrow his current search results by searching for particular keywords.

FIG. 15 shows a dialog that allows the user to narrow his current search results by searching for particular keywords. In FIG. 15, the "Narrow" button 1502 launches a keyword search similar to that of the Search Term navigator, for the information in the search term window 210. The search is performed only over the pieces of information in search results area 210.

Clicking on the "too many results", and "Wrong/no results" buttons 1504 and 1506 launches respective dialog boxes (not shown) that provide a predetermined list of actions for the user to perform to refine a query or resolve a problem. In the described embodiment, the list of actions is context sensitive, depending on the type of search previously executed and the number of search results found. For example, if the search was performed on a Tree node high in the tree and a large number of search results were found, the "too many results" button would suggest that the user select a node closer to the bottom of the tree.

Figure 16:
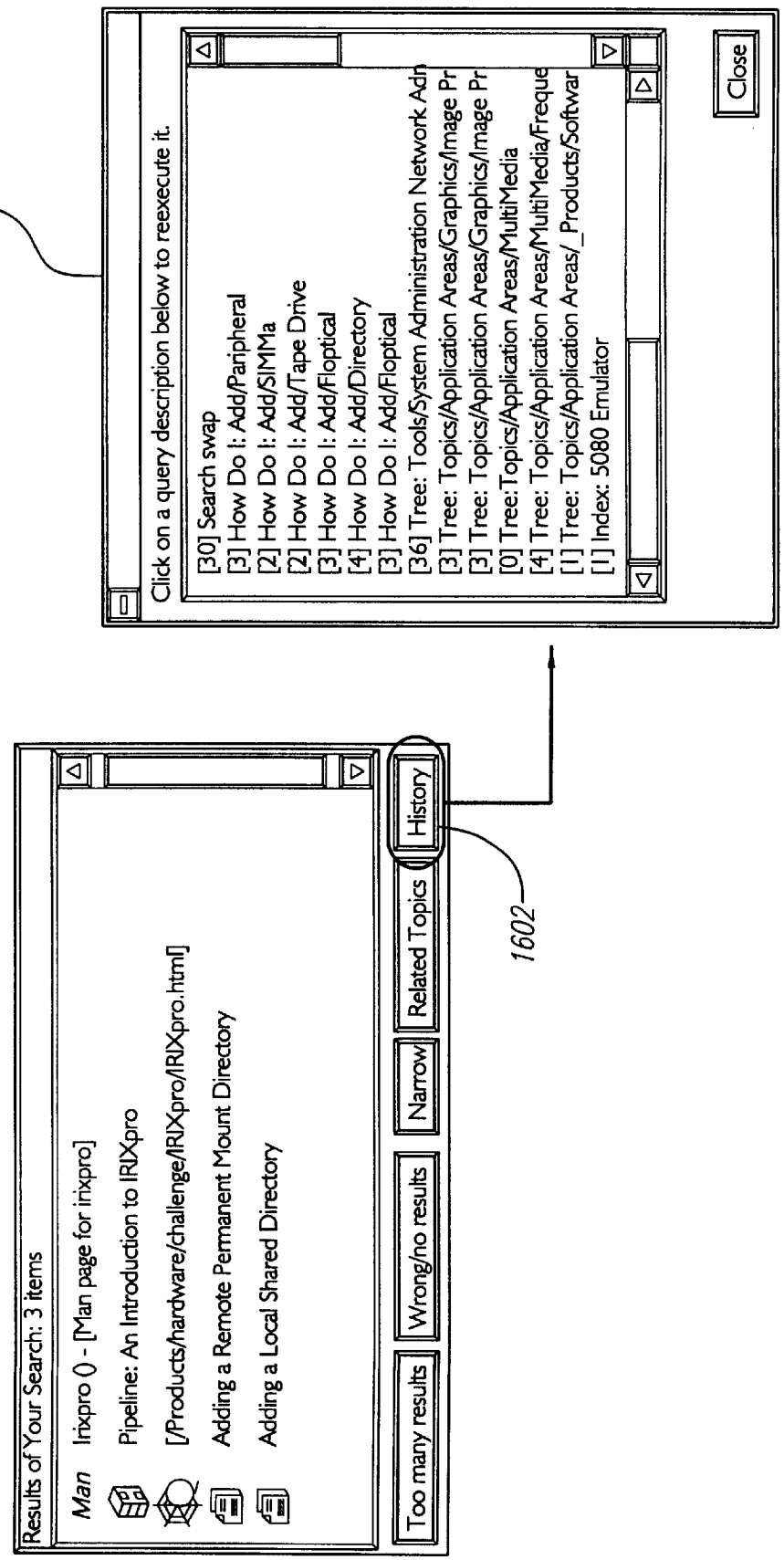
FIG. 16 shows an example of a "history" window.

FIG. 16 shows a history window 1601, displayed when the user clicks "History" button 1602. The history window displays the contents of all previous queries for the current execution session. The user may click on a displayed query in area 1601 to reissue the query. Each line in the history window represents a retrieval event and will display the number of documents retrieved, the navigator used, and (in accordance with the navigator used) either the tree branch, index term, verb-noun pair, or search term used in the query. To implement the history window, the state of a navigator is stored in memory 104 whenever a search is performed using that navigator. Specifically, the history information for the navigators is stored in history dialog object 570 of FIG. 5. Accessing the history window causes that information to be retrieved from memory and displayed. The selected navigator in area 202 is automatically changed to correspond to the reissued query.

While each individual navigator mechanism is useful by itself, there is a great deal of further power in the way the present invention echoes results of an action in other navigators. In the described embodiment, echoing occurs automatically in the current and minimized navigators. Another preferred embodiment includes a feature of "user-initiated echoing." Suppose, for example, that a user has just selected a node in the Tree navigator, and has gotten back a few results, descriptions of which are displayed in area 210. Looking through the descriptions, the user decides that none of them have exactly the desired answer, but that some of them are in the correct subject area.

The user then clicks on the "related topics" button 1702 to display cross-referencing information. This action causes certain tree nodes, index terms, and "How Do I?" verb-noun pairs in areas 204, 206, and 208 to be highlighted, indicating that the information in search results area 210 is cross-referenced to the elements in other navigators. The user may then for example, expand any of the minimized navigators and use the expanded navigator to find additional related information. The advantage of user-initiated echoing is that the user is not subjected to the echoing process on every search. If he happens to get what he wants, he is not distracted by the additional visual cues. However, it does tend to hide the echoing feature, compared to auto-echoing.

Figure 17:
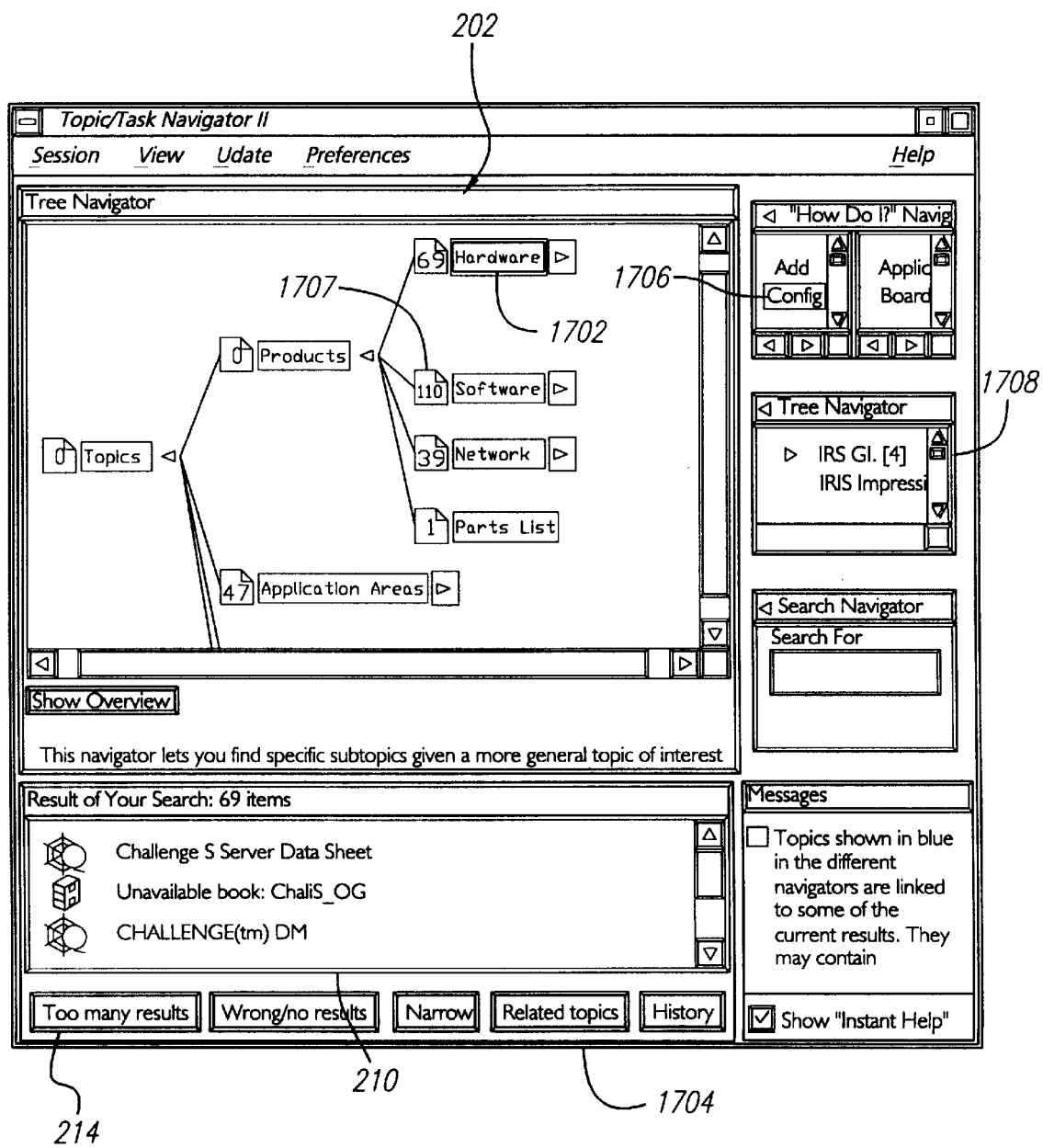
FIG. 17 shows an example of cross-referencing in the embodiment of the FIG. 1.

FIG. 17 shows an example of cross-referencing. In FIG. 17, the Tree navigator has been placed in area 202 and a search has been performed for selected "Hardware" node 1702. In the described embodiment, a selected node is colored yellow. The user then clicked on "Related Topics" button 1704 and all cross-reference information is highlighted in blue in area 202 and in minimized areas 204 and 206. In area 202, cross-reference term "software" 1707 is highlighted. Note that no cross-reference information is displayed for the Search Term navigator. In the "How Do I?" navigator in area 204, the verb "Config" 1708 is highlighted. In the Index navigator in area 206, the scroll bar shows blue lines in it, corresponding to terms that have been highlighted. In the described embodiment, a minimized navigator is shifted within respective areas 204, 206, or 208 so that at least one highlighted term is visible if possible.

As a further example, suppose that a keyword search retrieves too many results. Rather than read through them all, the user can, for example, click on "Related Topics" button 1704 and select the tree navigator (so that the Tree navigator is in area 202). Upon reviewing the tree nodes, it may become apparent that many of the results appear only in certain sections of the tree. By looking at the nodes around which the results are clustered, the user can quickly eliminate some of them as irrelevant, and concentrate on navigating through the tree to find the desired information. Thus, the user can combine and switch between navigators to take advantage of the conceptual mapping of information. Cross-referencing encourages the user to take advantage of the various navigators in order to find the desired information. The user can then switch between navigators to expand or refine the search.

Figure 18:
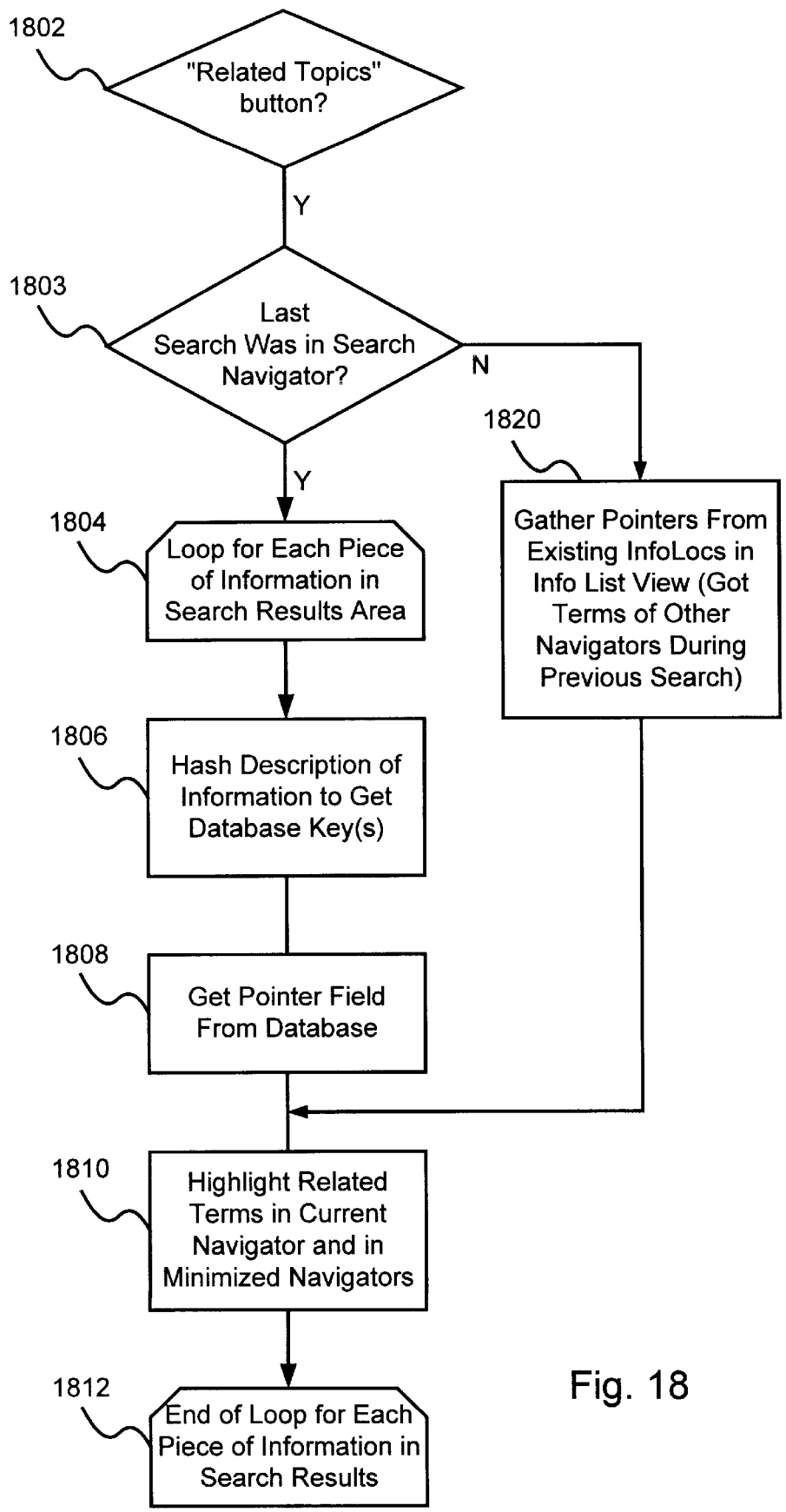
FIG. 18 is a flow chart showing steps performed during cross-referencing in the embodiment of FIG. 1.

FIG. 18 is a flow chart showing steps involved in cross-referencing when "Related Topics" button 1704 is clicked in step 1802. FIG. 5 shows a plurality of hash tables 580, one for each information type. As described above, each time a search is performed for the "How Do I?", Tree, and Index navigators, the pointers to the info_locs of the search results are stored in info_list_view 560. In contrast, each time a search is performed for the Search Term navigator, the search engine returns a plurality of addresses representing search results. Thus, in step 1803, if the most recent search was performed in the "How Do I?", Tree, or Index navigators, step 1820 gathers pointers from existing info_locs to obtain cross-referenced navigator elements. If, in step 1803, the most recent search was performed in the Search Term navigator, control passes to step 1804.

To cross-reference the search results for the Search Term navigator, steps 1804–1812 are performed for each piece of information. In step 1806, actual location (address) of the information is hashed via the hash table for the information type, and the corresponding database key 510 is determined. Field 516 of that entry yields pointers to the cross-reference terms for the current navigator and the minimal navigators. Note that the database entry for a single piece of search results information can have many pointers 516. In step 1810, cross-referenced elements in models 554, 556, and 558 (for each navigator) are noted and a corresponding navigator element (term/node/word pair) is highlighted in the appropriate current and minimized navigator areas in step 1810. Preferably, search terms are displayed in yellow and cross-reference information is displayed in blue.

III. Tabs and Echoing

Figure 19:
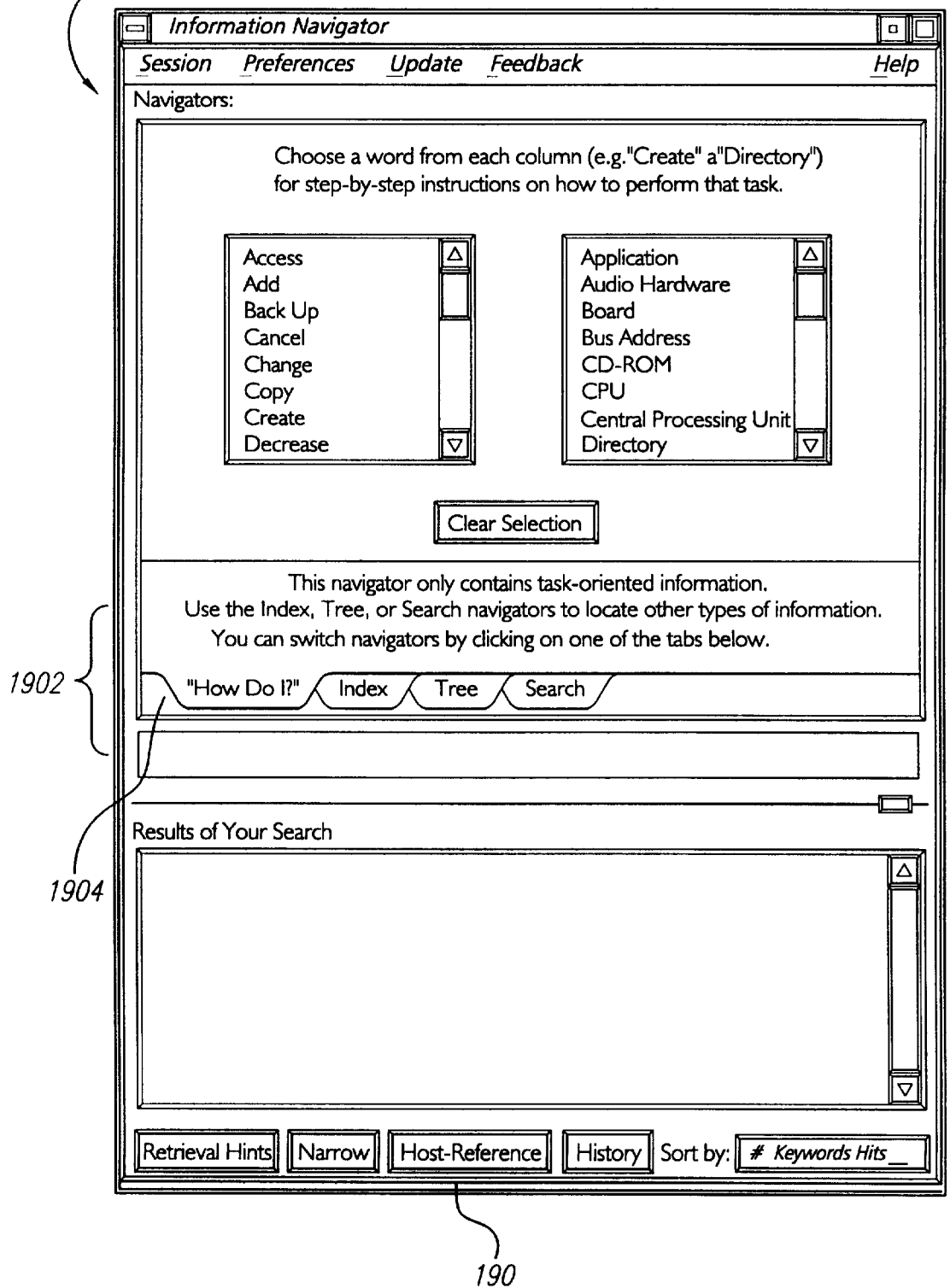
FIG. 19 shows an overview of an interface in a second preferred embodiment of the present invention.

FIG. 19 shows an interface in another preferred embodiment of the present invention. The embodiment differs from the previously described embodiments at least because it does not display minimized versions of unselected navigators. Instead, selected navigator area 202' has a plurality of tabs 1902 on its bottom edge. In FIG. 19, the "How Do I?" Navigator is the currently selected navigator and the "How Do I?" tab 1904 is displayed as being "on top" of the other tabs. The user can switch to a new navigator by clicking on the tab for that navigator. The navigators themselves operate similarly to those described above.

Figure 20:
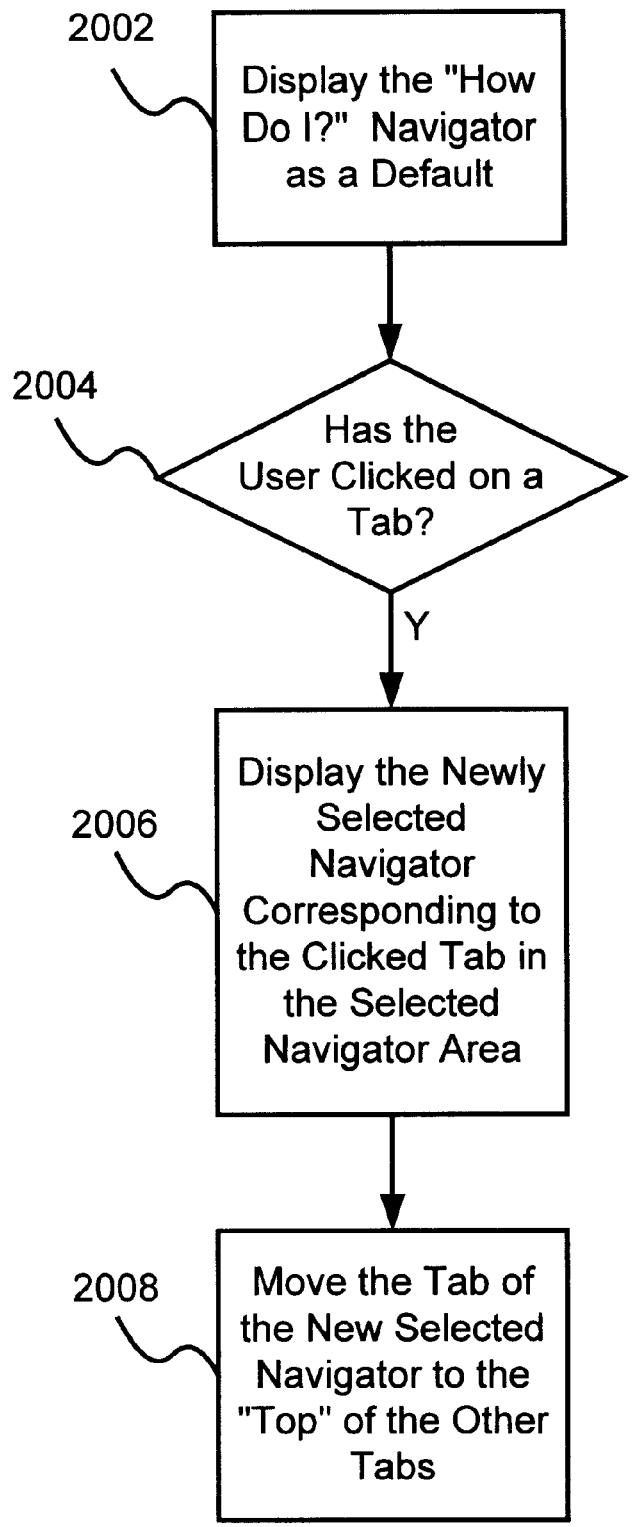
FIG. 20 is a flow chart showing steps performed when the user switches navigators.

FIG. 20 is a flow chart showing steps performed in the embodiment of the invention of FIG. 19. In step 2002, the "How Do I?" navigator is displayed as a default, as shown in FIG. 19. In step 2004, if the user selects a new navigator by clicking on the tab for that navigator step 2006, the new navigator is designated as the current navigator and displayed in area 202'. In step 2008, the tab of the new current navigator is placed on "top" of the other tabs.

Figure 21:
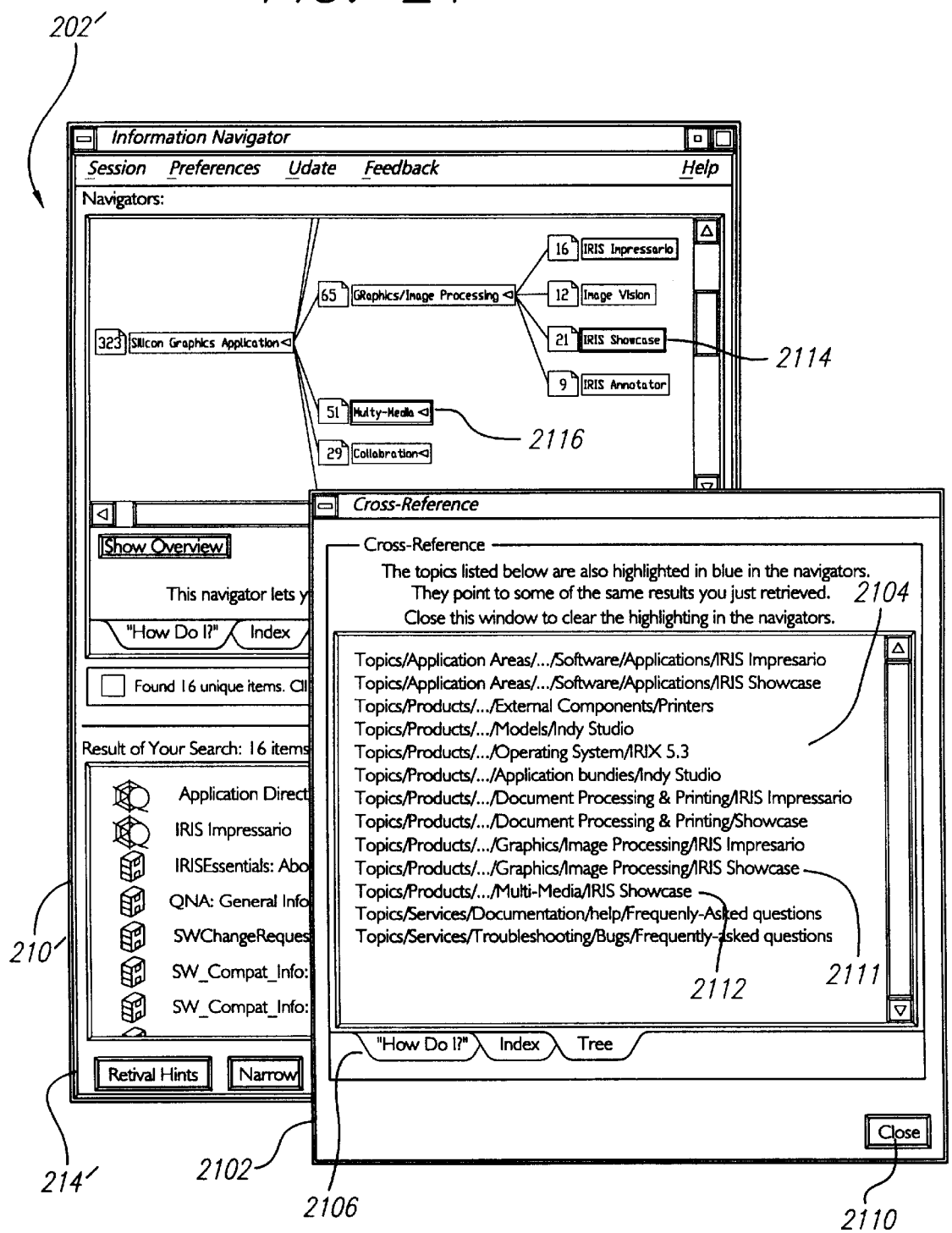
FIG. 21 shows an example of cross-referencing in the embodiment of FIG. 19.
Figure 22:
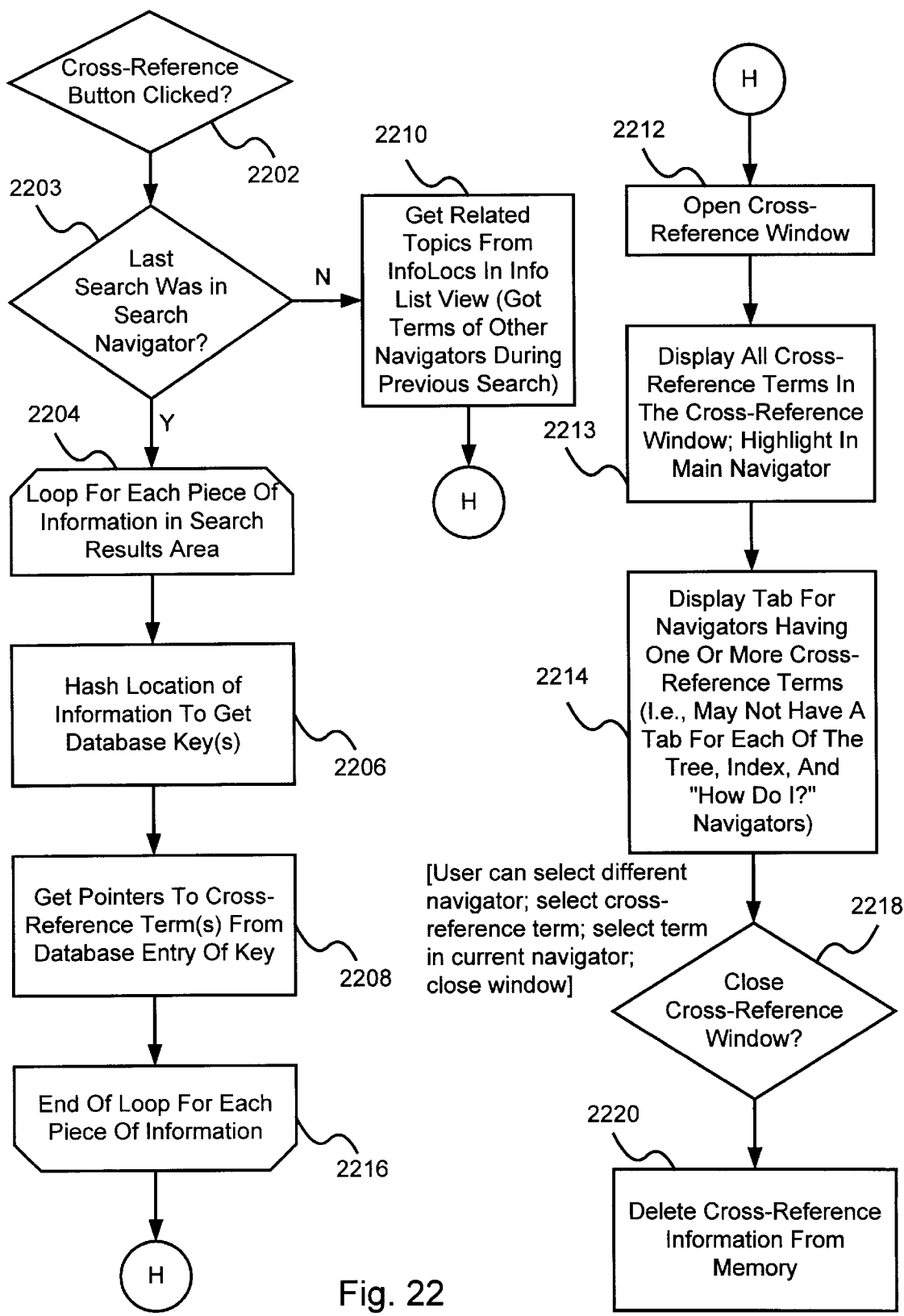
FIG. 22 is a flow chart showing steps performed during cross-referencing in the embodiment of FIG. 19.

FIG. 21 shows a Cross-Reference window 2102 in accordance with the embodiment of FIG. 20 where cross-reference information for the Tree navigator is displayed in area 2104. FIG. 22 is a flow chart of steps performed in the embodiment of FIG. 20 to obtain and display cross-reference information. In step 2202, if the user clicks on cross-reference button 1904, steps similar to those of FIG. 18 are performed to find all terms related to the current search results that can be viewed via other navigators.

If, in step 2203, the most recent search was not in the Search Term navigator, then the cross-reference pointers are obtained from the info_locs of the search results in step 2210 and control passes to step 2212. Otherwise, if the most recent search was in the "How Do I?", Tree, or Index navigators, then control passes to step 2204. In step 2204–2208, the location of each piece of information is hashed in hash tables 580 to yield a database entry. Field 516 yields the cross-reference terms for the current navigator and the minimized navigators.

In step 2212, a Cross-Reference window 2102 is opened. The cross-reference window has a second set of tabs 2106. If any cross-reference information was found for the Index, Tree, or "How Do I?" navigators, a corresponding tab bearing the name of the navigator is displayed as part of 2106. Thus, it is possible that not all navigators have a corresponding tab in cross-reference tabs 2106. Each piece of cross-reference information in Cross-Reference window 2102 has a corresponding highlighted term/node/word pair that can be displayed in area 202'. For example, in FIG. 21 the cross-reference information "Topics/Products/Graphics Image Processing/IRIS Showcase" 211 corresponds to Tree node 2114 and "Topics/Products/Multimedia/IRIS showcase" 2112 corresponds to Tree node 2116. The other nodes corresponding to the cross-reference information in area 2104 can be viewed by scrolling window 202'.

If a user clicks on an entry in the cross-reference subwindow, the navigator corresponding to that entry is brought to the front and that term/node is selected and its results retrieved. The user can also navigate through the current navigator, looking for blue terms/nodes. Clicking on "Close" button 2110 in steps 2218 and 2220 closes the Cross-Reference window and clears highlighted cross-referenced terms/nodes/pairs.

In FIG. 21, the Tree navigator uses a slightly different scheme for expansion and collapsing of nodes. Clicking on an arrow next to an expanded term collapses it. Clicking on an arrow next to an unexpanded term, or on the unexpanded term itself, expands it. Clicking on an expanded term retrieves information from all its subterms (no information is directly attached to a top-level term that has subterms). Clicking on a top-level term with no subterms, or on a subterm, retrieves information from that term or subterm.

In summary, the present invention includes a plurality of navigators and allows the user to easily switch between them. In a first embodiment, unselected navigators are displayed in minimized form and information displayed in a selected navigator is automatically echoed in the current and minimized navigators. In another preferred embodiment, echoing in the current and minimized navigators is not performed automatically, but is performed when the user presses a "related topic" button. In another embodiment, only one navigator is shown at a time. The user can switch between navigators by clicking on tabs displayed below the currently selected navigator.

A first preferred embodiment includes "automatic echoing," in which cross-referenced information is automatically displayed in the current and minimized navigator areas. Cross-referenced information is displayed in yellow and search information is displayed in blue. In another preferred embodiment, echoing is not automatic, but is initiated by the user. After a search has been performed and search results displayed, clicking a "related topic" or "cross-reference" button identifies information in non-selected navigators that is related to the search results. Another preferred embodiment identifies the cross-reference information by displaying it in a window, but only displays it if a new navigator is selected via a tab in the Cross-Reference window. Cross-referencing, echoing, and the ability to switch between navigators encourage the user to take advantage of the various navigators in order to find the desired information. The user can switch between navigators to expand or refine the search. The availability of various navigators also allows the navigator tool to be useful to a wider variety of users, since different users prefer different navigators.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method of searching an information space, comprising the steps, performed by a data processing system, of:
   displaying an initial window, wherein one navigator of a plurality of navigators, designated as a first current navigator, is displayed in a current navigator area;
   displaying, in the initial window, respective navigator areas representing others of the plurality of navigators;
   inputting an indication that the user wishes to use a particular one of the other navigators as a new current navigator; and
   displaying, in the current navigator area of the initial window, the particular navigator indicated by the user in the current navigator window, in place of the current navigator.

2. The method of claim 1,
   wherein the step of displaying respective navigator areas includes the step of displaying minimized navigator areas including portions of the other navigators; and
   further including the step of switching the first current navigator and the new current navigator between the minimized navigator area and the current navigator area.

3. The method of claim 1,
   wherein the step of displaying respective navigator areas include the step of displaying tabs representing the other navigators; and
   further including the step of displaying a tab for the new current navigator "on top" of the tabs after the user has indicated a new current navigator.

4. The method of claim 1, further including performing a search on the information space using a search parameter input via the first current navigator.

5. The method of claim 1, further including performing a search on the information space using a search parameter input via the particular navigator indicated by the user.

6. The method of claim 1, further including performing a search on the information space using a search parameter input via a navigator in the current navigator window.

7. The method of claim 1, wherein the information space includes a plurality of types of information.

8. The method of claim 1, wherein the information space includes at least two of: manuals, unix manpages, World Wide Web documents, and TaskCards.

9. The method of claim 8, wherein the information space includes at least one of TaskCards, Task Pros, Online Release Notes, and software applications.

10. The method of claim 1, wherein the plurality of navigators include at least two of a "How do I?" navigator, an Index navigator, a Tree Navigator, and a Search Term navigator.

11. The method of claim 1,
    wherein the information space includes a plurality of information types, and further including the steps of:
    performing a search of the information space using the first current navigator, to yield search results; and
    echoing the search results in a one of the navigator areas, representing another of the plurality of navigators.

12. The method of claim 11, wherein the echoing step is performed automatically after the searching step.

13. The method of claim 1,
    performing a search of the information space using the first current navigator, to yield search results;
    inputting an indication from the user that the user wishes to cross-reference the search results;
    hashing into a database of the information space, in accordance with the search results, to yield database keys of the search results; and
    highlighting elements of a displayed navigator that correspond to the database keys.

14. The method of claim 13, wherein the highlighting step includes the substep of highlighting elements of the first current navigator that correspond to the database keys.

15. The method of claim 13, wherein the highlighting step includes the substeps of:
    displaying another of the plurality of navigators in place of the first current navigator, designated as a new current navigator; and
    highlighting elements of the new current navigator that correspond to the database keys.

16. A method of searching an information space including a plurality of types of information, comprising the steps, performed by a data processing system, of:
    displaying an initial window, wherein one navigator of a plurality of navigators, designated as a current navigator, is displayed in a current navigator window;
    inputting a search term via the current navigator; and
    performing a search of at least two types of information in the information space in accordance with the search parameter, wherein a respective search engine is used to search each respective information type.

17. The method of claim 16, further including the step of performing a search of at least two types of information in the information space using another of the plurality of navigators.

18. The method of claim 16, wherein the information space includes at least two of: manuals, unix manpages, and World Wide Web documents, and TaskCards.

19. The method of claim 18, wherein the information space includes at least one of Taskcards, Task Pros, Online Release Notes, and software applications.

20. An apparatus for searching an information space having a plurality of information types therein, comprising:
- a database including respective entries for each piece of information in the information space, where a database entry includes a database key and a pointer to the location of the respective piece of information in the information space;
- a navigator selector mechanism that allows a user to chose one of a plurality of navigators as a current navigator;
- a search input mechanism that obtains a search parameter from the current navigator; and
- a search mechanism that performs a search over at least two types of information in the information space in accordance with the search parameter.

21. A method of inputting a search parameter for an information space, comprising the steps, performed by a data processing system, of:
- displaying a list of verbs;
- displaying a list of nouns;
- inputting an indication from a user that the user has selected a first word from a first one of the displayed lists, the other list being the second list;
- altering the display of the second list to indicate which words of the second list correspond to the user-selected word;
- inputting an indication from a user that the user has selected a second word from the second list, where the second user-selected word is a word that corresponds to the first user-selected word.

22. The method of claim 21, further including the step of:
- using the first and second user-selected words as search parameters to search the information space.

23. The method of claim 22, further including the steps of:
- indicating an error, after the altering step, when the user tries to select a word from the second list that does not correspond to the first user-selected word.

* * * * *